(12) United States Patent
Nio et al.

(10) Patent No.: US 6,738,528 B1
(45) Date of Patent: May 18, 2004

(54) BLOCK NOISE DETECTOR AND BLOCK NOISE ELIMINATOR

(75) Inventors: Yutaka Nio, Osaka (JP); Satoshi Okamoto, Osaka (JP); Katsumi Terai, Higashiosaka (JP); Naoji Okumura, Mino (JP); Kazuhito Tanaka, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/463,215

(22) PCT Filed: May 18, 1999

(86) PCT No.: PCT/JP99/02589

§ 371 (c)(1),
(2), (4) Date: Jan. 21, 2000

(87) PCT Pub. No.: WO99/62264

PCT Pub. Date: Dec. 2, 1999

(30) Foreign Application Priority Data

May 22, 1998 (JP) .......................................... 10-140887

(51) Int. Cl.[7] .............................................. G06K 9/40
(52) U.S. Cl. ....................... 382/268; 382/232; 382/233; 358/426.14
(58) Field of Search ........................ 382/173, 232–233, 382/250–251, 261, 263, 264, 266, 268–269, 275; 348/384.1, 390.1, 398.1, 400.1, 425.2; 358/426.04, 426.14; 375/240.11, 241, 243

(56) References Cited

U.S. PATENT DOCUMENTS

| | | | | |
|---|---|---|---|---|
| 5,384,849 A | * | 1/1995 | Jeong ....................... 348/425.2 |
| 5,410,350 A | | 4/1995 | Kato et al. ................ 348/400.1 |
| 5,426,673 A | * | 6/1995 | Mitra et al. ................... 375/241 |
| 5,563,662 A | * | 10/1996 | Kishi ...................... 375/240.24 |
| 5,625,714 A | * | 4/1997 | Fukuda ........................ 382/233 |
| 5,675,666 A | * | 10/1997 | Komuro et al. ............. 382/232 |
| 5,694,492 A | * | 12/1997 | Kim ........................... 382/262 |
| 5,751,861 A | | 5/1998 | Astle .......................... 382/250 |
| 5,877,813 A | * | 3/1999 | Lee et al. .............. 375/240.12 |
| 5,883,983 A | * | 3/1999 | Lee et al. .................... 382/268 |
| 6,167,164 A | * | 12/2000 | Lee ............................. 382/261 |
| 6,226,045 B1 | * | 5/2001 | Vidovich .................... 348/539 |
| 6,259,823 B1 | * | 7/2001 | Lee et al. .................... 382/268 |

FOREIGN PATENT DOCUMENTS

| | | |
|---|---|---|
| EP | 0 7571 171 | 11/1993 |
| EP | 0 721 286 | 7/1996 |
| EP | 0 781 053 | 6/1997 |
| EP | 0 797 349 | 9/1997 |
| WO | 96/42165 | 12/1996 |

\* cited by examiner

*Primary Examiner*—Daniel Mariam
(74) *Attorney, Agent, or Firm*—Wenderoth, Lind & Ponack, L.L.P.

(57) ABSTRACT

A vertical HPF and a horizontal HPF receive a video signal 101, and extract only a high frequency component in the vertical/horizontal directions, respectively. Absolute value taking parts take an absolute value of the high frequency components, respectively, and change their values to positive values. A horizontal accumulating/adding part and a vertical accumulating/adding part accumulate/add an input signal so as to output a vertical one-dimensional signal and a horizontal one-dimensional signal, respectively, each periodically having a peak value in the respective vertical and horizontal directions. A horizontal peak detecting part detects a horizontal peak position according to the horizontal one-dimensional signal. A vertical peak detecting part detects a vertical peak position according to the vertical one-dimensional signal and identifies a format thereof. A binarization part obtains a block boundary image, according to the horizontal peak position and the vertical peak position, in which pixel positions having a peak are provided with 1 and remaining pixel positions are provided with 0. In this manner, even if a block boundary to eliminate block noise thereon is not clearly identified, it becomes possible to correctly detect and eliminate the block boundary.

90 Claims, 21 Drawing Sheets

F I G. 2
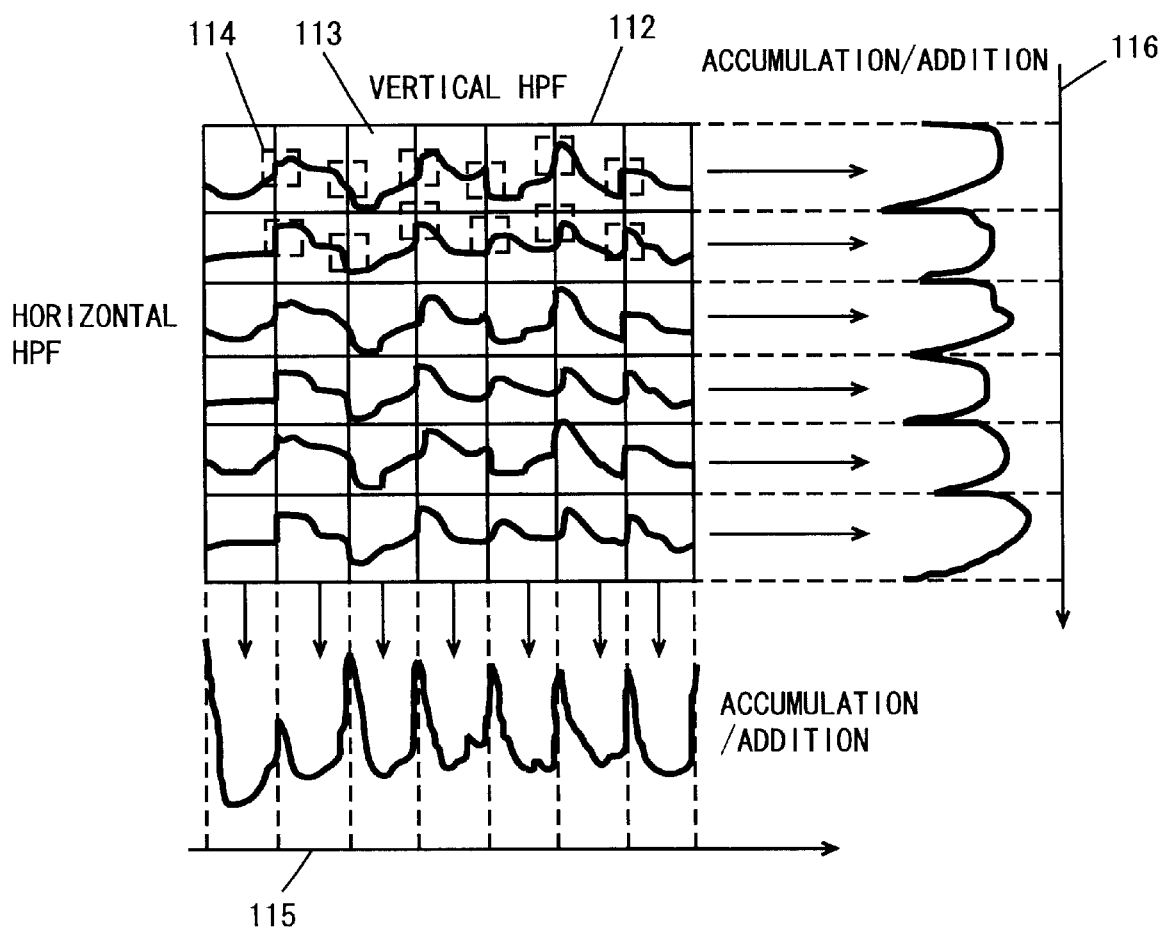

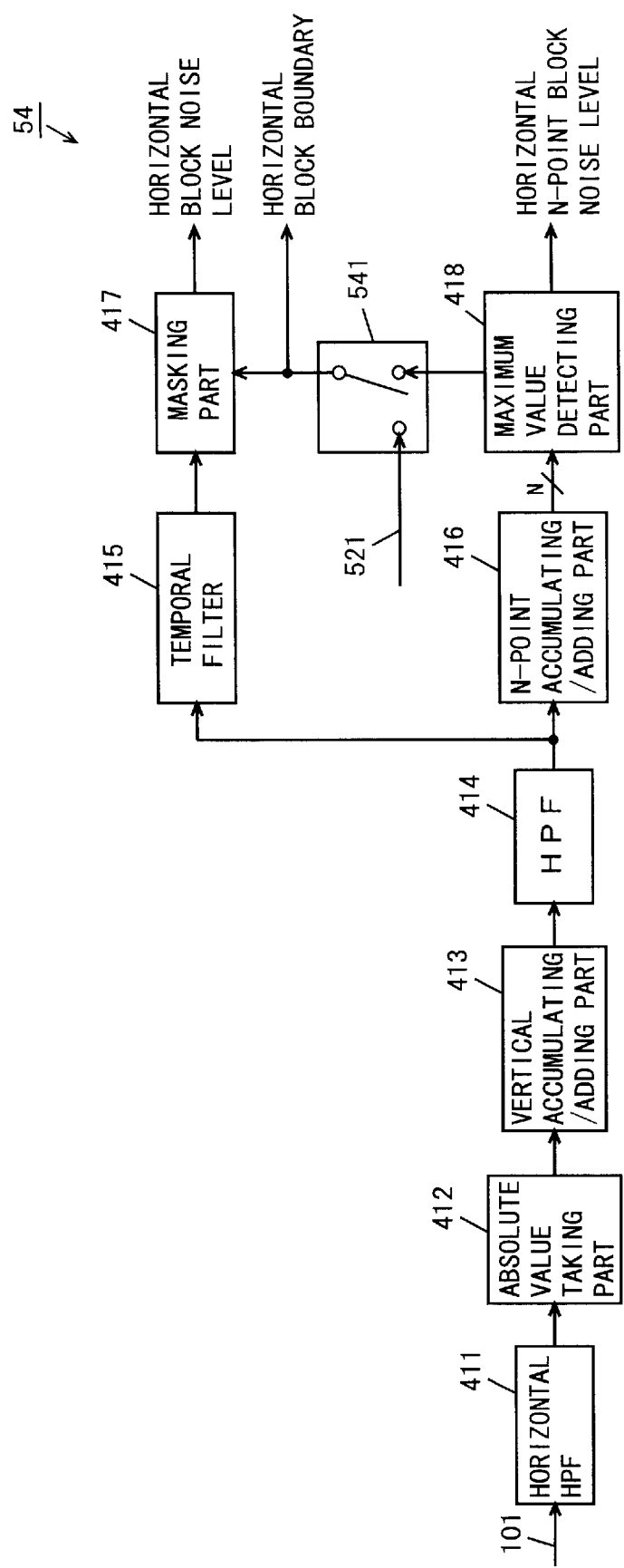
F I G. 1 8

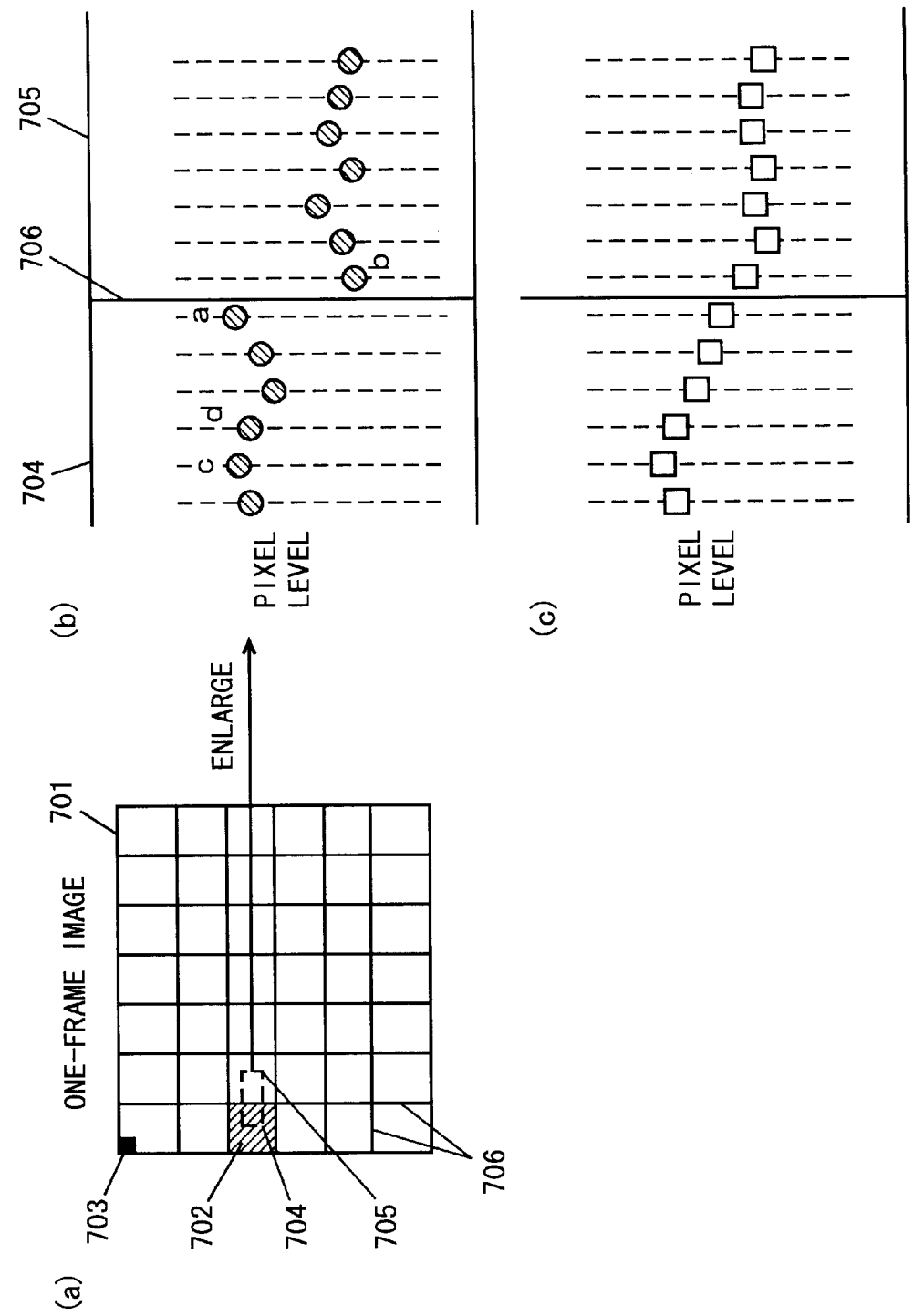

BLOCK NOISE DETECTOR AND BLOCK NOISE ELIMINATOR

TECHNICAL FIELD

The present invention relates to block noise detecting apparatuses and block noise eliminating apparatuses, and more particularly to a block noise detecting apparatus and a block noise eliminating apparatus of a type eliminating block noise that arises in digital images as a result of image encoding carried out by compressing the digital images for transferring and recording.

BACKGROUND ART

Data compression is conventionally done for digital images, for example, to store the digital images with a lower volume of data. Such data compression includes a lossless encoding method and a lossy encoding method. In the lossless encoding method, encoded data, after decoding, can be completely identical to data before encoding. On the other hand, in the lossy encoding method, encoded data, after decoding, cannot always be identical to data before encoding and may include some degree of error.

The lossless encoding method generally includes discrete cosine transform (hereinafter, referred to as DCT). After DCT is carried out, quantization often follows. In this manner, when data is encoded first through DCT and then quantization, for example, the data cannot be completely identical to data before encoding and includes noise (error). This means that an encoding operation first through DCT and then quantization is lossy encoding.

To carry out DCT, first of all, a one-frame image is regionally divided into a plurality of blocks. A block herein is a group of 8×8 two-dimensional pixel data, for example, and is regarded as a unit. Data encoded through DCT and quantization can be reconstituted by being subjected to inverse quantization and inverse DCT. Through the inverse quantization and inverse DCT, image data including block noise can be reconstituted.

Herein, block noise is described by referring to FIGS. 24(a)–(c).

FIGS. 24(a)–(c) are diagrams illustrating a conventional concept in eliminating the block noise. FIG. 24(a) shows a one-frame image 701, FIG. 24(b) is an enlarged view of a partial boundary (hereinafter, referred to as block boundary) 706 between a block 704 and a block 705 adjacent thereto in FIG. 24(a), and FIG. 24(c) shows a state of pixels in FIG. 24(b) after being smoothed.

It is now assumed, in FIG. 24(a), that pixels are in line in specific blocks in the one-frame image 701. In FIG. 24(b), when a pixel a in the block 704 and pixel b in the block 705 are presumably bordering on the block boundary 706, a difference in pixel level therebetween being larger than a difference in in-block pixel level between a pixel c and pixel d, for example, causes that part to be block noise. Accordingly, image quality in the part will be degraded to a greater degree.

As is known from this, block noise results from a level difference between pixels bordering on a block boundary in one-frame image.

The block noise is common in the lossy encoding method including DCT and quantization where processing is carried out on a block basis. To eliminate noise arisen in images, generally, the images are entirely subjected to smoothing. Smoothing is an operation of determining a pixel in average by using various pixels around a pixel to be processed. An operation of smoothing images with a low-pass filter (hereinafter, referred to as LPF) having a few taps is also referred to as smoothing. Such smoothing can eliminate not only block noise but noise, observed in images in their entirety as shown in FIG. 24(c).

Although there is no doubt that smoothing done on pixels can advantageously eliminate block noise, edges of images other than the block noise are also smoothed. Therefore, the images will disadvantageously be blurred.

Further, in the above conventional technique, the block noise can only be eliminated in a case where a block size and a block boundary are perfectly identified.

Still further, in a case where edges of images are bordering on the block boundary, the block noise causes less influence at the edges of the images. In the conventional technique in the foregoing, however, every block boundary is subjected to smoothing. In this manner, the edges of images bordering on the block boundary will be blurred, and thus, smoothing done on the block boundary may degrade image quality to a greater degree.

Therefore, an object of the present invention is to provide a block noise detecting apparatus of a type correctly detecting a block boundary targeted to eliminate block noise even when it is not clearly identified.

Another object of the present invention is to provide block noise eliminating apparatus of a type eliminating block noise without blurring images, not smoothing images even on a block boundary, if block noise thereon is low, and best matching to visual scenes.

Still another object of the present invention is to provide a block noise eliminating apparatus of a type eliminating block noise observed in an input signal even if the input signal is an analog signal or external digital signal (DVD or STB, for example) in a multi-format (interlace system or progressive system, for example).

Further, a dot clock can be regenerated in a video processing system by using the block noise detecting apparatus of the present invention.

SUMMARY OF THE INVENTION

The present invention has the following features to attain the objects above.

A first aspect is directed to a block noise detecting apparatus of a type detecting, from a digital video signal subjected to lossy encoding on a predetermined image block basis, block noise caused by decoding the video signal, the apparatus comprising:

means for detecting a level of the block noise in the video signal; and means for detecting a block boundary (where the block noise is generated) in the video signal.

As described above, in the first aspect, by correctly detecting a block boundary of an image to be regionally divided into a plurality of blocks and a block noise level thereon, block noise can be detected.

A second aspect is directed to a block noise detecting apparatus of a type detecting, from a digital video signal subjected to lossy encoding on a predetermined image block basis, block noise caused by decoding the video signal, the apparatus comprising:

signal extracting means for receiving the video signal and extracting only a high frequency component therefrom;

absolute value taking means for taking an absolute value of a high frequency component signal outputted from the signal extracting means;

accumulating/adding means for accumulating/adding the absolute-value-taken high frequency component signal outputted from the absolute value taking means in a predetermined period;

periodicity detecting means for detecting periodicity of the block noise in accordance with an accumulation/addition result outputted from the accumulating/adding means; and block boundary determining means for determining a block boundary (where the block noise is generated) from a periodic signal detected by the periodicity detecting means.

As described above, in the second aspect, by detecting periodicity of block noise and by correctly detecting a block boundary of an image to be regionally divided into a plurality of blocks, the block noise can be detected.

According to a preferable and concrete third aspect, in the second aspect, the block boundary determining means distinguishes, in binary, between positional information on the block boundary and positional information a remainder of the blocks. In this manner, a block boundary can be easily provided.

According to a fourth aspect, in the second and third aspects, the block noise detecting apparatus further comprises:

frame difference taking means for receiving the video signal and determining a signal difference among a plurality of predetermined frames thereof;

region determining means for determining, by referring to the signal difference outputted from the frame difference taking means for whether or not the difference is more than a predetermined threshold value, a region where the block noise to be eliminated is observed (hereinafter, referred to as noise region); and block edge controlling means for masking the block boundary determined by the block boundary determining means in the noise region determined by the region determining means, and then determining a block boundary corresponding to the noise region.

As described above, in the fourth aspect, it becomes possible to further classify a block boundary compared to the second and third aspects by referring to the extent of image variation of images having block noise. As a result, only parts having high block noise observed in visual scenes can be detected as the block boundary.

According to a preferable and concrete fifth aspect, in the fourth aspect, the frame difference taking means determines a signal difference between a current frame and a one-frame-before frame. In this manner, only parts having high block noise observed in visual scenes can be detected as a block boundary.

According to a preferable and concrete sixth aspect, in the fourth and fifth aspects, the region determining means preferably distinguishes, in binary, between a part exceeding the threshold value and a part not exceeding the threshold value. In this manner, noise regions can be easily provided.

According to a seventh aspect, in the fourth to sixth aspects, the block noise detecting apparatus further comprises singular point eliminating means for excluding a noise part observed in a predetermined small region of the noise region determined by the region determining means, wherein the block edge controlling means masks the block boundary determined by the block boundary determining means in the noise-part-excluded noise region outputted from the singular point eliminating means.

As described above, in the seventh aspect, the smaller regions in the image, in the fourth to sixth aspects, which hardly benefit from noise elimination by smoothing are eliminated. In this manner, processing of taking a frame difference can be enhanced and accordingly, image quality is improved and data is reduced in volume.

According to a preferable eighth aspect, in the second to seventh aspects, the signal extracting means, the absolute value taking means, the accumulating/adding means, and the periodicity detecting means each execute processing for the video signal in either a horizontal or vertical direction, or both directions.

According to a ninth aspect, in the eighth aspect, when each of the processing is executed for the video signal in the vertical direction, the periodicity detecting means successively changes frames used for detection according to a format of the video signal to be inputted.

As described above, in the ninth aspect, a block boundary can be correctly detected without deteriorating periodicity of block image regardless of formats (interlace system/progressive system, for example) of a video signal to be inputted in the eighth aspect.

A tenth aspect is directed to a block noise eliminating apparatus of a type detecting and eliminating, from a digital video signal subjected to lossy encoding on a predetermined image block basis, block noise caused by decoding the video signal, the apparatus comprising:

means for detecting a level of the block noise in the video signal;

means for detecting a block boundary (where the block noise is generated) in the video signal; and means for eliminating, in the block boundary, only the block noise whose the detected level is more than a predetermined threshold value.

As described above, in the tenth aspect, by correctly detecting a block boundary of an image to be regionally divided into a plurality of blocks and a block noise level thereon, the block noise can be detected. In this manner, block noise observed on the block boundary can be eliminated.

An eleventh aspect is directed to a block noise eliminating apparatus of a type detecting and eliminating, from a digital video signal subjected to lossy encoding on a predetermined image block basis, block noise caused by decoding the video signal, the apparatus comprising:

signal extracting means for receiving the video signal and extracting only a high frequency component therefrom;

absolute value taking means for taking an absolute value of a high frequency component signal outputted from the signal extracting means;

accumulating/adding means for accumulating/adding the absolute-value-taken high frequency component signal outputted from the absolute value taking means in a predetermined period;

periodicity detecting means for detecting periodicity of the block noise in accordance with an accumulation/addition result outputted from the accumulating/adding means;

block boundary determining means for determining a block boundary (where the block noise is generated) from a periodic signal detected by the periodicity detecting means; and block noise eliminating means for eliminating the block noise with respect to the block boundary.

As described above, in the eleventh aspect, by detecting periodicity of block noise and by correctly detecting a block boundary of an image to be regionally divided into a plurality of blocks, the block noise can be detected. In this manner, block noise observed on the block boundary can be eliminated.

According to a preferable and concrete twelfth aspect, in the eleventh aspect, the block boundary determining means distinguishes, in binary, between positional information on the block boundary and positional information a remainder of the blocks. In this manner, a block boundary can be easily provided.

According to a thirteenth aspect, in the eleventh and twelfth aspects, the block noise eliminating apparatus further comprises:

frame difference taking means for receiving the video signal and determining a signal difference among a plurality of predetermined frames thereof;

region determining means for determining, by referring to the signal difference outputted from the frame difference taking means for whether or not the difference is more than a predetermined threshold value, a region where the block noise to be eliminated is observed (hereinafter, referred to as noise region); and block edge controlling means for masking the block boundary determined by the block boundary determining means in the noise region determined by the region determining means, and then determining a block boundary corresponding to the noise region, wherein the block noise eliminating means eliminates the block noise with respect to the block boundary corresponding to the noise region.

As described above, in the thirteenth aspect, it becomes possible to further classify a block boundary as compared to the eleventh and twelfth aspects by referring to the extent of image variation of images having block noise. As a result, only parts having high block noise observed in visual scenes can be detected and eliminated as the block boundary.

According to a preferable and concrete fourteenth aspect, in the thirteenth aspect, the frame difference taking means preferably determines a signal difference between a current frame and a one-frame-before frame. In this manner, only parts having high block noise observed in visual scenes can be detected and eliminated as the block boundary.

According to a preferable and concrete fifteenth aspect, in the thirteenth and fourteenth aspects, the region determining means distinguishes, in binary, between a part exceeding the threshold value and a part not exceeding the threshold value. In this manner, noise regions can be easily provided.

According to a sixteenth aspect, in the thirteenth to fifteenth aspects, the block noise eliminating means further comprises singular point eliminating means for excluding a noise part observed in a predetermined small region of the noise region determined by the region determining means, wherein the block edge controlling means masks the block boundary determined by the block boundary determining means in the noise-part-excluded noise region outputted from the singular point eliminating means.

As described above, in the sixteenth aspect, the smaller regions in the image, in the thirteenth to fifteenth aspects, which hardly benefit from noise elimination by smoothing are eliminated. In this manner, processing of taking the frame difference can be enhanced and accordingly, image quality is improved and data is reduced in volume.

According to a preferable seventeenth aspect, in the eleventh to sixteenth aspects, the signal extracting means, the absolute value taking part, the accumulating/adding means, and the periodicity detecting means each preferably execute processing for the video signal in either a horizontal or vertical direction, or both directions.

According to an eighteenth aspect, in the seventeenth aspect, the block noise eliminating apparatus further comprises identifying means for identifying a format for the video signal to be inputted, wherein when each of the processing is executed for the video signal in the vertical direction, the identifying means has the periodicity determining means successively change frames used for detection according to the format.

As described above, in the eighteenth aspect, a block boundary can be correctly detected without deteriorating periodicity of block image regardless of formats (interlace system/progressive system, for example) of a video signal to be inputted in the seventeenth aspect.

A nineteenth aspect is directed to a block noise eliminating apparatus of a type detecting and eliminating, from a digital video signal subjected to lossy encoding on a predetermined image block basis, block noise caused by decoding the video signal, the apparatus comprising:

vertical block boundary detecting means for receiving the video signal and detecting, with respect to the video signal, a block boundary (where the block noise is generated) in the lateral direction and a block noise level on a screen;

horizontal block boundary detecting means for receiving the video signal and detecting, with respect to the video signal, the block boundary in a longitudinal direction and block noise level on the screen;

block area detecting means for specifying the block boundary in both longitudinal and lateral directions from detection results of the vertical block boundary detecting means and the horizontal block boundary detecting means; and block boundary smoothing means for smoothing the video signal to be inputted in a predetermined manner corresponding to the block boundary in both the longitudinal and lateral directions specified by the block area detecting means.

As described above, in the nineteenth aspect, a block boundary and block noise level can be correctly detected. In this manner, smoothing can be properly done according to the block noise level, and thus, block noise can be eliminated more effectively for the best match to the visual scenes.

According to a twentieth aspect showing the preferable and concrete structure, in the nineteenth aspect, the vertical block boundary detecting means comprises:

a vertical high-pass filter (hereinafter, referred to as HPF) extracting only a vertical high frequency component of the video signal;

first absolute value taking means for taking an absolute value of a high frequency component signal outputted from the vertical HPF;

horizontal accumulating/adding means for accumulating/adding the absolute-value-taken high frequency component signal outputted from the first absolute value taking means in the horizontal direction;

a first HPF extracting high a frequency component from the accumulated/added high frequency component signal outputted from the horizontal accumulating/adding means;

first N-point accumulating/adding means for accumulating/adding a signal outputted from the first HPF on a predetermined N-point basis (where N is a positive integer);

a first temporal filter detecting the block noise level of the video signal by computing the signal outputted from the first HPF in the temporal direction;

first maximum value detecting means for determining a maximum value and a position thereof among N-piece accumulated/added values determined by the first N-point accumulating/adding means through accumulation/addition; and first masking means for masking the block noise level detected by the first temporal filter at the position of the maximum value outputted from the first maximum value detecting means, and then determining a vertical block boundary corresponding to the position, wherein the horizontal block boundary detecting means comprises:

a horizontal HPF extracting only a horizontal high frequency component of the video signal;

second absolute value taking means for taking an absolute value of a high frequency component signal outputted from the horizontal HPF;

vertical accumulating/adding means for accumulating/adding the absolute-value-taken high frequency component signal outputted from the second absolute value taking means in the vertical direction;

a second HPF extracting a high frequency component from the accumulated/added high frequency component signal outputted from the vertical accumulating/adding means;

N-point accumulating/adding means for accumulating/adding a signal outputted from the second HPF on a predetermined N-point basis;

a second temporal filter detecting the block noise level of the video signal by computing the signal outputted from the second HPF in the temporal direction;

second maximum value detecting means for determining a maximum value and a position thereof among the N-piece accumulated/added values determined by the second N-point accumulating/adding means through accumulation/addition; and second masking means for masking the block noise level detected by the second temporal filter at the position of the maximum value outputted from the second maximum value detecting means and then determining a vertical block boundary corresponding to the position.

In this manner, it becomes possible to detect the block noise level with less variation in the temporal direction, and to execute smoothing in an appropriate manner according to the block noise level. Accordingly, block noise can be eliminated more effectively for the best match to the visual scenes.

A twenty-first aspect is directed to a block noise eliminating apparatus of a type detecting and eliminating, from a digital video signal subjected to lossy encoding on a predetermined image block basis, block noise caused by decoding the video signal, the apparatus comprising:

AD converting means for receiving the video signal in an analog fashion and then converting the same into a digital fashion;

digital decoding means for receiving the video signal in an encoded digital fashion for decoding and outputting the decoded block boundary information;

a selector receiving the video signal outputted from the AD converting means and the video signal outputted from the digital decoding means and selectively outputting either one of the video signals as is externally instructed;

vertical block boundary detecting means for receiving the video signal selected by the selector and detecting, with respect to the video signal, a block boundary (where the block noise is generated) in the lateral direction and a block noise level on a screen;

horizontal block boundary detecting means for receiving the video signal selected by the selector and detecting, with respect to the video signal, the block boundary in the longitudinal direction and the block noise level on a screen;

block area detecting means for specifying the block boundary in both longitudinal and lateral directions from detection results of the vertical block boundary detecting means and the horizontal block boundary detecting means; and block boundary smoothing means for smoothing the video signal to be inputted in a predetermined manner corresponding to the block boundary in both longitudinal and lateral directions specified by the block area detecting means, wherein the vertical block boundary detecting means and the horizontal block boundary detecting means output, to the block area detecting means, the block boundary based on each of the detection results when the selector selects the video signal outputted from the AD converting means, and output the block boundary based on the block boundary information outputted from the digital decoding means when the selector selects the video signal outputted from the digital decoding means.

As described above, in the twenty-first aspect, a block boundary and block noise level corresponding to a video signal to be inputted can be correctly detected. In this manner, smoothing can be done in a proper manner according to the block noise level, and thus block noise can be eliminated more effectively for the best match to the various visual scenes to be inputted.

According to a twenty-second aspect showing the preferable and concrete structure, in the twenty-first aspect, the vertical block boundary detecting means preferably comprises:

a vertical high-pass filter (hereinafter, referred to as HPF) extracting only a vertical high frequency component of the video signal;

first absolute value taking means for taking an absolute value of a high frequency component signal outputted from the vertical HPF;

horizontal accumulating/adding means for accumulating/adding the absolute-value-taken high frequency component signal outputted from the first absolute value taking means in the horizontal direction;

a first HPF extracting a high frequency component from the accumulated/added high frequency component signal outputted from the horizontal accumulating/adding means;

first N-point accumulating/adding means for accumulating/adding a signal outputted from the first HPF on a predetermined N-point basis (where N is a positive integer);

a first temporal filter detecting the block noise level of the video signal by computing the signal outputted from the first HPF in the temporal direction;

first maximum value detecting means for determining a maximum value and a position thereof among N-piece accumulated/added values determined by the first N-point accumulating/adding means through accumulation/addition;

a first selector synchronizing with the selector's selection and selectively outputting either one of the block boundary information outputted from the digital decoding means or the position of the maximum value outputted from the first maximum value detecting means; and first masking means for masking the block noise level detected by the first temporal filter at the block boundary outputted from the first selector, and determining a vertical block boundary corresponding to the position, wherein the horizontal block boundary detecting means comprises:

a horizontal HPF extracting only a horizontal high frequency component of the video signal;

second absolute value taking means for taking an absolute value of a high frequency component signal outputted from the horizontal HPF;

vertical accumulating/adding means for accumulating/adding the absolute-value-taken high frequency component signal outputted from the second absolute value taking means in the vertical direction;

a second HPF extracting a high frequency component from an accumulated/added high frequency component signal outputted from the vertical accumulating/adding means;

N-point accumulating/adding means for accumulating/adding a signal outputted from the second HPF on a predetermined N-point basis;

a second temporal filter detecting the block noise level of the video signal by computing the signal outputted from the second HPF in the temporal direction;

second maximum value detecting means for determining a maximum value and a position thereof among the N-piece accumulated/added values determined by the second N-point accumulating/adding means through accumulation/addition;

a second selector synchronizing with the selector's selection and selectively outputting either one of the block boundary information outputted from the digital decoding means or the position of the maximum value outputted from the second maximum value detecting means; and second masking means for masking the block noise level detected by the second temporal filter at the block boundary outputted from the second selector, and determining a vertical block boundary corresponding to the position.

In this manner, it becomes possible to detect the block noise level less in variation in the temporal direction, and to execute smoothing in an appropriate manner according to the block noise level. Accordingly, block noise can be eliminated more effectively for the best match to the various visual scenes to be inputted.

According to a twenty-third aspect showing the preferable and concrete structure, in the twentieth and twenty-second aspects, the block boundary smoothing means preferably comprises:

a horizontal HPF extracting only a horizontal high frequency component of the video signal;

first multiplying means for multiplying an output of the horizontal HPF and an output of the horizontal block boundary detecting means;

first deducting means for deducting an output of the first multiplying means from the video signal;

a vertical HPF extracting only a vertical high frequency component of the video signal;

second multiplying means for multiplying an output of the vertical HPF and an output of the vertical block boundary detecting means; and second deducting means for deducting an output of the second multiplying means from the video signal, wherein the block noise is eliminated according to the block noise level.

In this manner, block noise can be effectively eliminated without deteriorating a video signal to be inputted.

According to a twenty-fourth aspect, in the nineteenth to twenty-third aspects, the block noise eliminating apparatus further comprises picture enhancing means for controlling a picture enhancement level emphasizing an outline part of the video signal according to the block noise level detected by the horizontal block boundary detecting means and the vertical block boundary detecting means.

As described above, in the twenty-fourth aspect, it becomes possible to properly carry out picture enhancement according to the block noise level, whereby picture enhancement of a video signal can be done without emphasizing block noise in the nineteenth to twenty-third aspects.

According to a twenty-fifth aspect, in the nineteenth to twenty-fourth aspects, the block noise eliminating apparatus further comprises controlling means for specifying the video signal (type or quality thereof, for example) to be inputted in accordance with the block noise level detected by the horizontal block boundary detecting means and the vertical block boundary detecting means, and the controlling means on-screen-displays a result of the specification on a screen in a predetermined format.

As described above, in the twenty-fifth aspect, effects obtained by elimination of video sources or block noise can be acknowledged at a glance by on-screen-displaying information in the nineteenth to twenty-fourth aspects.

A twenty-sixth aspect is directed to a vertical block boundary detecting apparatus of a type detecting, from a digital video signal subjected to lossy encoding on a predetermined image block basis, block noise in the vertical direction caused by decoding the video signal, the apparatus comprising:

a vertical high-pass filter (hereinafter, referred to as HPF) receiving the video signal and extracting only a vertical high frequency component of the video signal;

absolute value taking means for taking an absolute value of a high frequency component signal outputted from the vertical HPF;

horizontal accumulating/adding means for accumulating/adding the absolute-value-taken high frequency component signal outputted from the absolute value taking means in the horizontal direction;

an HPF extracting a high frequency component from the accumulated/added high frequency component signal outputted from the horizontal accumulating/adding means;

N-point accumulating/adding means for accumulating/adding a signal outputted from the HPF on a predetermined N-point basis (where N is a positive integer);

a temporal filter detecting the block noise level of the video signal by computing the signal outputted from the HPF in the temporal direction;

maximum value detecting means for determining a maximum value and a position thereof among N-piece accumulated/added values determined by the N-point accumulating/adding means through accumulation/addition; and masking means for masking the block noise level detected by the temporal filter at the position of the maximum value outputted from the maximum value detecting means, and determining a vertical block boundary corresponding to the position.

As described above, in the twenty-sixth aspect, a device for detecting a block boundary in the vertical direction is structured separately.

A twenty-seventh aspect is directed to a horizontal block boundary detecting apparatus of a type detecting, from a digital video signal subjected to lossy encoding on a predetermined image block basis, block noise in the horizontal direction caused by decoding the video signal, the apparatus comprising:

a horizontal high-pass filter (hereinafter, referred to as HPF) receiving the video signal and extracting only a vertical high frequency component of the video signal;

absolute value taking means for taking an absolute value of a high frequency component signal outputted from the horizontal HPF;

vertical accumulating/adding means for accumulating/adding the absolute-value-taken high frequency component signal outputted from the absolute value taking means in the vertical direction;

an HPF extracting a high frequency component from the accumulated/added high frequency component signal outputted from the vertical accumulating/adding means;

N-point accumulating/adding means for accumulating/adding a signal outputted from the HPF on a predetermined N-point basis (where N is a positive integer);

a temporal filter detecting the block noise level of the video signal by computing the signal outputted from the HPF in the temporal direction;

maximum value detecting means for determining a maximum value and a position thereof among N-piece accumulated/added values determined by the N-point accumulating/adding means through accumulation/addition; and masking means for masking the block noise level detected by the temporal filter at the position of the maximum value outputted from the maximum value detecting means, and determining a horizontal block boundary corresponding to the position.

As described above, in the twenty-seventh aspect, a device for detecting a block boundary in the horizontal direction is structured separately.

A twenty-eighth aspect is directed to a dot clock controlling apparatus of a type controlling a dot clock to be regenerated in a video processing system in which a digital video signal subjected to lossy encoding on a predetermined image block basis is processed, the apparatus comprising:

clock generating means for generating the dot clock used in the video processing system in accordance with a horizontal synchronizing pulse;

horizontal block boundary detecting means for receiving the video signal and detecting a longitudinal block boundary (where block noise is generated) on a screen with respect to the video signal; and controlling means for changing delay of the clock generating means in such a manner that the block boundary detected by the horizontal block boundary detecting means periodically has a single maximum point (peak).

As described above, in the twenty-eighth aspect, a horizontal block boundary corresponding to the video signal to be inputted is detected, and then a dot clock is regenerated according to positions thereof. In this manner, a clock whose phase is coincided with that of a dot clock of the video signal can be correctly regenerated.

According to a twenty-ninth aspect showing the preferable and concrete structure, in the twenty-eighth aspect, the horizontal block boundary detecting means comprises:

a horizontal high-pass filter (hereinafter, referred to as HPF) receiving the video signal and extracting only a vertical high frequency component of the video signal;

absolute value taking means for taking an absolute value of a high frequency component signal outputted from the horizontal HPF;

vertical accumulating/adding means for accumulating/adding the absolute-value-taken high frequency component signal outputted from the absolute value taking means in the vertical direction;

an HPF extracting a high frequency component from the accumulated/added high frequency component signal outputted from the vertical accumulating/adding means; and N-point accumulating/adding means for accumulating/adding a signal outputted from the HPF on a predetermined N-point basis (where N is a positive integer).

In this manner, it becomes possible to correctly regenerate a clock whose phase is coincided with that of a dot clock of the video signal.

A thirtieth aspect is directed to a recording medium containing a program recorded thereon, to be run in a computer device, for detecting block noise from a digital video signal subjected to lossy encoding on a predetermined image block basis caused by decoding the video signal, the program for realizing an operational environment on the computer device comprising the steps of:

extracting only a high frequency component from the video signal;

taking an absolute value of the extracted high frequency component signal;

accumulating/adding the absolute-value-taken high frequency component signal in a predetermined period;

detecting periodicity of the block noise in accordance with the accumulation/addition result; and determining a block boundary (where the block noise is generated) in accordance with a signal having the detected periodicity.

According to a thirty-first aspect, in the thirtieth aspect, the program further comprises a step of eliminating the block noise with respect to the block boundary.

According to a preferable and concrete thirty-second aspect, in the thirtieth and thirty-first aspects, in the step of determining the block boundary, positional information on the block boundary and positional information on the rest are distinguished, in binary, from each other.

According to a thirty-third aspect, in the thirtieth to thirty-second aspects, the program further comprises the steps of:

determining a signal difference among a plurality of predetermined frames of the video signal;

determining a region where block noise to be eliminated is observed (hereinafter, referred to as noise region) with reference whether or not the signal difference is larger than a predetermined threshold value; and masking the block boundary in the noise region, and determining a block boundary corresponding to the noise region.

According to a preferable and concrete thirty-fourth aspect, in the thirty-third aspect, in the step of determining the signal difference, a signal difference between a current frame and a one-before-frame is determined.

According to a preferable and concrete thirty-fifth aspect, in the thirty-third to thirty-fourth aspects, in the step of determining the noise region, a part exceeding the threshold value and a part not exceeding the threshold value are distinguished, in binary, from each other.

According to a thirty-sixth aspect, in the thirty-third to thirty-fifth aspects, the recording medium further comprises a step of eliminating a noise part in a predetermined small region of the noise region, wherein in the step of determining a block boundary corresponding to the noise block, the block boundary is masked in the noise-part-eliminated noise region.

According to a preferable and concrete thirty-seventh aspect, in the thirtieth to thirty-sixth aspects, each of the steps is executed in either a horizontal direction or vertical direction of the video signal, or in both directions.

According to a thirty-eighth aspect, in the thirty-seventh aspect, when each of the processing is executed in the vertical direction of the video signal, in the step of detecting periodicity, frames used for detection are successively changed corresponding to a format of the video signal to be inputted.

A thirty-ninth aspect is directed to a recording medium containing a program recorded thereon, to be run in a computer device, for detecting block noise from a digital video signal subjected to lossy encoding on a predetermined image block basis caused by decoding the video signal, the program for realizing an operational environment on the computer device comprising the steps of:

detecting, with respect to the video signal, a block boundary (where the block boundary is generated) in the lateral direction and a block noise level on the screen;

detecting, with respect to the video signal, the block boundary in the longitudinal direction and block noise level on the screen;

specifying the block boundary in both longitudinal and lateral directions from a detection result obtained in the step of detecting as to the lateral direction and the step of detecting as to the longitudinal direction; and smoothing the video signal in a predetermined manner corresponding to the block boundary in both the longitudinal and lateral directions.

According to a fortieth aspect showing the preferable and concrete technique, in the thirty-ninth aspect, the step of detecting as to the lateral direction comprises the steps of:

extracting only a vertical high frequency component from the video signal;

taking an absolute value of the extracted high frequency component signal;

accumulating/adding the absolute-value-taken high frequency component signal in the horizontal direction;

again extracting a high frequency component from the accumulated/added high frequency component signal;

accumulating/adding a signal outputted in the step of again extracting the high frequency component on a predetermined N-point basis (N is a positive integer);

detecting the block noise level of the video signal by computing the signal outputted in the step of again extracting high frequency component in the temporal direction; determining a maximum value and a position thereof among N-piece accumulated/added values determined by the accumulation/addition; and masking the detected block noise level at the position of the maximum value, and determining a vertical block boundary corresponding to the position, and the step of detecting as to the longitudinal direction comprises the steps of:

extracting only a horizontal high frequency component of the video signal;

taking an absolute value of the extracted high 10 frequency component signal;

accumulating/adding the absolute-value-taken high frequency component signal in the vertical direction;

again extracting a high frequency component from the accumulated/added high frequency component signal;

accumulating/adding a signal outputted in the step of again extracting the high frequency component on a predetermined N-point basis;

detecting the block noise level of the video signal by computing the signal outputted in the step of again extracting high frequency component in the temporal direction;

determining a maximum value and a position thereof among the N-piece accumulated/added values determined by the accumulation/addition; and masking the detected block noise level at the position of the maximum value, and determining a vertical block boundary corresponding to the position.

A forty-first aspect is directed to a recording medium containing a program recorded thereon, to be run in a computer device, for detecting block noise from a digital video signal subjected to lossy encoding on a predetermined image block basis caused by decoding the video signal, the program for realizing an operational environment on the computer device further comprising the steps of:

converting the video signal in an analog fashion into a digital fashion;

decoding the digital-encoded video signal;

outputting the decoded block boundary information;

selecting either one of a video signal outputted in the converting step or a video signal outputted in the decoding step as is externally instructed;

detecting a lateral block boundary on a screen and a block noise level with respect to the video signal outputted in the selecting step;

detecting a longitudinal block boundary on a screen and a block noise level with respect to the video signal outputted in the selecting step;

specifying the block boundary in both longitudinal and lateral directions from detection results obtained in the step of detecting the lateral direction and the step of detecting the longitudinal direction; and smoothing the video signal in a predetermined manner according to the block boundary in both the longitudinal and lateral directions, wherein in the step of detecting as to lateral direction and the step of detecting as to longitudinal direction, the block boundary based on each of the detection results is outputted for the video signal outputted in the converting step, and the block boundary based on the decoded block boundary information are outputted for the video signal outputted in the decoding step.

According to a forty-second aspect showing the preferable and concretive technique, in the forty-first aspect, the step of detecting as to the lateral direction comprises the steps of:

extracting only a vertical high frequency component of
the video signal;

taking an absolute value of the extracted high frequency
component signal;

accumulating/adding the absolute-value-taken high frequency component signal in the horizontal direction-;

again extracting high frequency component from the
accumulated/added high frequency component signal;

accumulating/adding a signal outputted in the step of
again extracting the high frequency component on a
predetermined N-point basis (n is a positive integer);

detecting the block noise level of the video signal by
computing the signal outputted in the step of again
extracting high frequency component in the temporal
direction;

determining a maximum value and a position thereof
among N-piece accumulated/added values determined
by the accumulation/addition; and synchronizing with the selecting step, and selectively
outputting either one of the block boundary information
and the maximum value position; and masking the block noise level at the block boundary
outputted in the selectively outputting step, and determining a vertical block boundary corresponding to the
position, and the step of detecting as to longitudinal direction comprises
the steps of:

extracting only a horizontal high frequency component of
the video signal;

taking an absolute value of the extracted high frequency
component signal;

accumulating/adding the absolute-value-taken high frequency component signal in the vertical direction-;

again extracting a high frequency component from the
accumulated/added high frequency component signal;

accumulating/adding a signal outputted in the step of
again extracting the high frequency component on a
predetermined N-point basis;

detecting the block noise level of the video signal by
computing the signal outputted in the step of again
extracting the high frequency component in the temporal direction;

determining a maximum value and a position thereof
among the N-piece accumulated/added values determined by the accumulation/addition; and synchronizing with the selecting step, and selectively
outputting either one of the block boundary information
or the position of the maximum value; and masking the block noise level at the block boundary
outputted in the selectively outputting step, and determining a horizontal block boundary corresponding to
the position.

According to a forty-third aspect, in the fortieth and
forty-second aspects, the smoothing step further comprises:

a horizontal step of extracting only a horizontal high
frequency component of the video signal;

a horizontal multiplying step of multiplying an output
in the horizontal step and an output in the longitudinal detecting step;

a step of deducting an output in the horizontal multiplying step from the video signal;

a vertical step of extracting only a vertical high frequency component of the video signal;

a vertical multiplying step of multiplying an output in
the vertical step and an output in the lateral detecting
step; and a step of deducting an output in the vertical multiplying
step from the video signal, wherein the block noise is eliminated according to the block noise
level.

According to a forty-fourth aspect, in the thirty-ninth to
forty-third aspects, the program further comprising a step of controlling a
picture enhancement level emphasizing an outline of
the video signal according to the block noise level
detected in the step of detecting as to the longitudinal
direction and the step of detecting as to the lateral
direction.

According to a forty-fifth aspect, in the thirty-ninth to
forth-fourth aspects, the program further comprises a step of
specifying the video signal (types or quality thereof, for
example) to be inputted in accordance with the block noise
level detected in the step of detecting as to longitudinal
direction and the step of detecting as to the lateral direction,
wherein in the specifying step, the specification result is onscreen-displayed on a screen in a predetermined format.

A forth-sixth aspect is directed to a recording medium
containing a program recorded thereon, to be run in a
computer device, for detecting block noise in the vertical or
horizontal direction from a digital video signal subjected to
lossy encoding on a predetermined image block basis caused
by decoding the video signal, the program for realizing an
operational environment on the computer device comprising
the steps of:

extracting only a vertical or horizontal high frequency
component of the video signal;

taking an absolute value of the extracted high frequency
component signal;

accumulating/adding the absolute-value-taken high frequency component signal in the horizontal or vertical
direction;

again extracting a high frequency component from the
accumulated/added high frequency component signal;

accumulating/adding a signal outputted in the step of
again extracting the high frequency component on a
predetermined N-point basis (N is a positive integer);

detecting the block noise level of the video signal by
computing the signal outputted in the step of again
extracting the high frequency component in the temporal direction;

determining a maximum value and a position thereof
among N-piece accumulated/added values determined
by the accumulation/addition; and masking the detected block noise level at the position of
the maximum value, and determining a vertical or
horizontal block boundary corresponding to the position.

A forty-seventh aspect is directed to a recording medium
containing a program recorded thereon, to be run in a
computer device, for controlling a dot clock to be regenerated in a video processing system in which a digital video
signal subjected to lossy encoding on a predetermined image
block basis is processed, the program for realizing an
operational environment on the computer device comprising
the steps of:

receiving the video signal, and detecting, with respect to
the video signal, a block boundary (where block noise
is generated) in the longitudinal direction on a screen;
and changing clock delay in such a manner that the detected block boundary periodically has a single maximum point (peak) with respect to a clock generating device in which the dot clock used for the video processing system is generated based on a horizontal synchronizing pulse.

According to a forty-eighth aspect showing the preferable and concrete technique, in the forty-seventh aspect, the detecting step further comprises the steps of:

extracting only a horizontal high frequency component of the video signal;

taking an absolute value of the extracted high frequency component signal;

accumulating/adding the absolute-value-taken high frequency component signal in the vertical direction;

again extracting a high frequency component from the accumulated/added high frequency component signal; and accumulating/adding the signal outputted in the step of again extracting the high frequency component on a predetermined N-point basis (N is a positive integer).

As described above, the thirtieth to forty-eighth aspects are directed to a recording medium on which a computer program for executing each function realized by each device in the first to twenty-ninth aspects is recorded. This is for supplying the first to twenty-ninth aspects in the form of software for an existing device.

BRIEF DESCRIPTION OF THE DRAWINGS

FIG. 2 is a diagram illustrating how a vertical HPF 11, a horizontal HPF 12, absolute value taking parts 13 and 14, a horizontal accumulating/adding part 15, and a vertical accumulating/adding part 16 in FIG. 1 are operated.

FIG. 18 is a block diagram exemplarily showing the structure of a horizontal block boundary detecting part 54 in FIG. 17.

FIGS. 24(a)–(c) are diagrams illustrating a conventional concept in eliminating block noise.

BEST MODE FOR CARRYING OUT THE INVENTION

Hereinafter, a block noise detecting apparatus and a block noise eliminating apparatus of the present invention are described next below on a functional block basis.

First Embodiment

Figure 1:
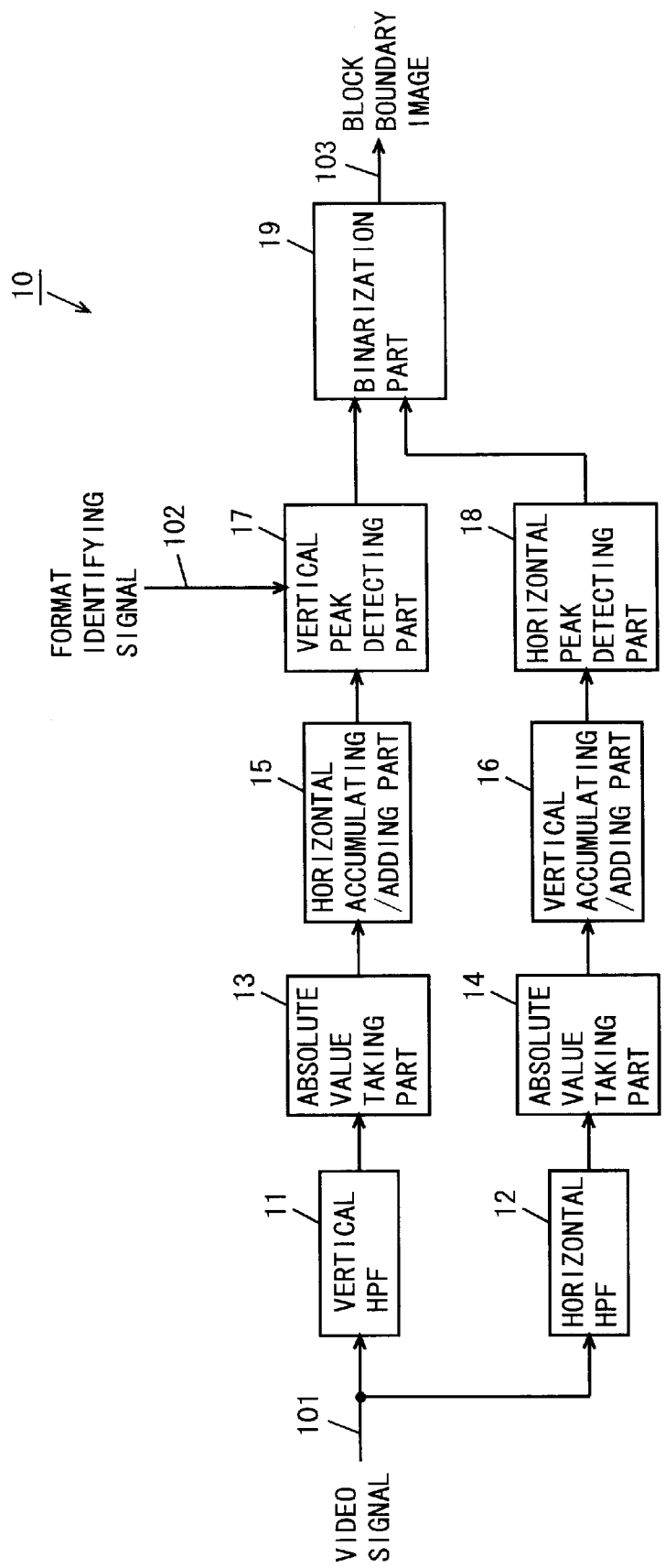
FIG. 1 is a block diagram showing the structure of a block noise detecting apparatus according to a first embodiment of the present invention.

FIG. 1 is a block diagram showing the structure of a block noise detecting apparatus according to a first embodiment of the present invention. In FIG. 1, a block noise detecting apparatus 10 of the first embodiment is structured by a vertical high-pass filter (hereinafter, referred to as vertical HPF) 11, a horizontal high-pass filter (hereinafter, referred to as horizontal HPF) 12, absolute value taking parts 13 and 14, a horizontal accumulating/adding part 15, a vertical accumulating/adding part 16, a vertical peak detecting part 17, a horizontal peak detecting part 18, and a binarization part 19.

FIG. 2 is a diagram illustrating how each of the vertical HPF 11, horizontal HPF 12, absolute value taking parts 13 and 14, horizontal accumulating/adding part 15, and vertical accumulating/adding part 16 in FIG. 1 is operated.

Figure 3:
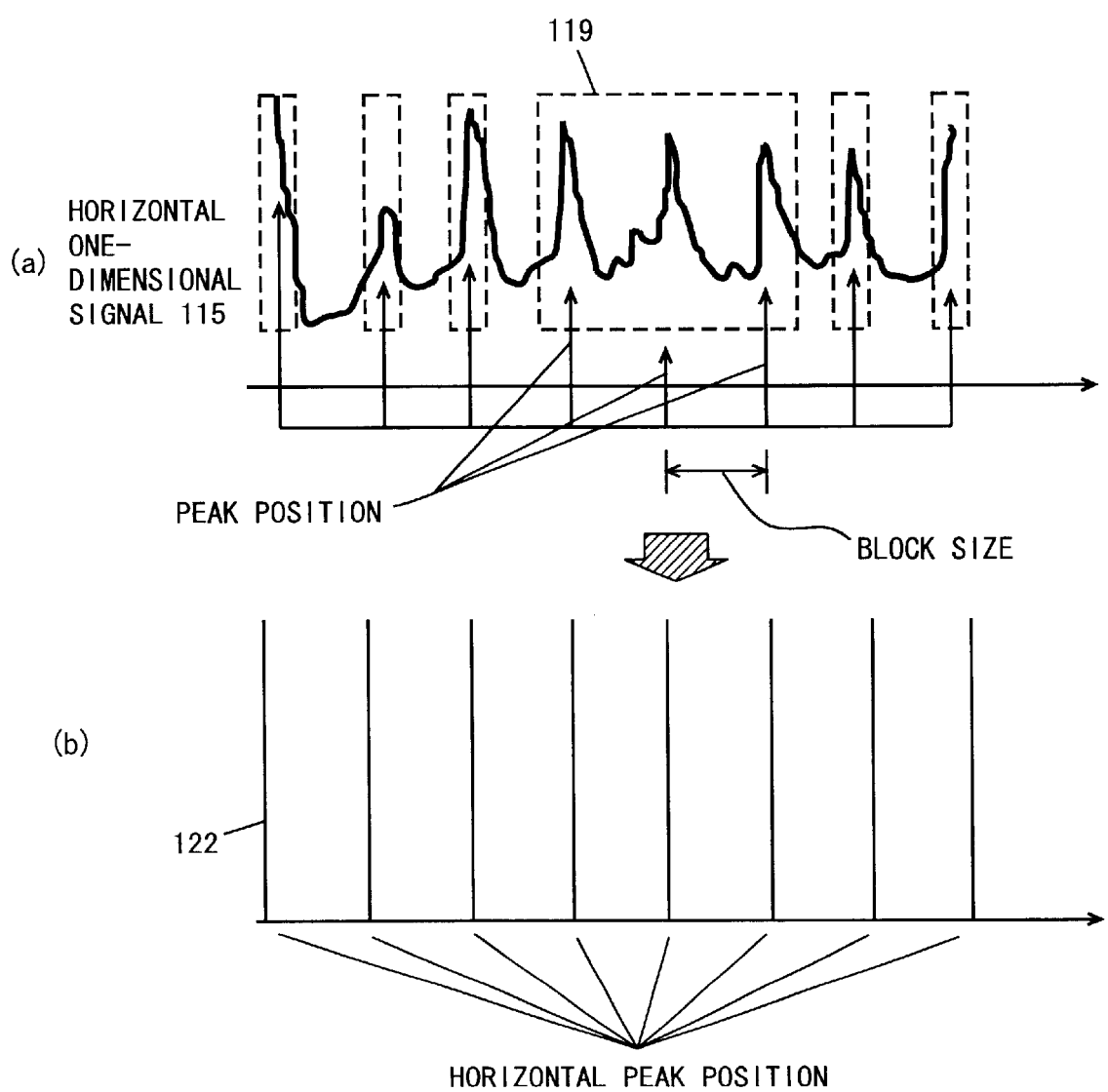
FIGS. 3(a) and (b) are diagrams exemplarily illustrating how a horizontal peak detecting part 18 (and a vertical peak detecting part 17) in FIG. 1 is operated.

FIGS. 3(a) and (b) are diagrams exemplarily illustrating how the horizontal peak detecting part 18 (and the vertical peak detecting part 17) in FIG. 1 is operated. Note that, FIG. 3(a) shows a horizontal one-dimensional signal 115 outputted from the vertical accumulating/adding part 16, and FIG. 3(b) shows a horizontal peak position 122 outputted from the horizontal peak detecting part 18.

Figure 4:
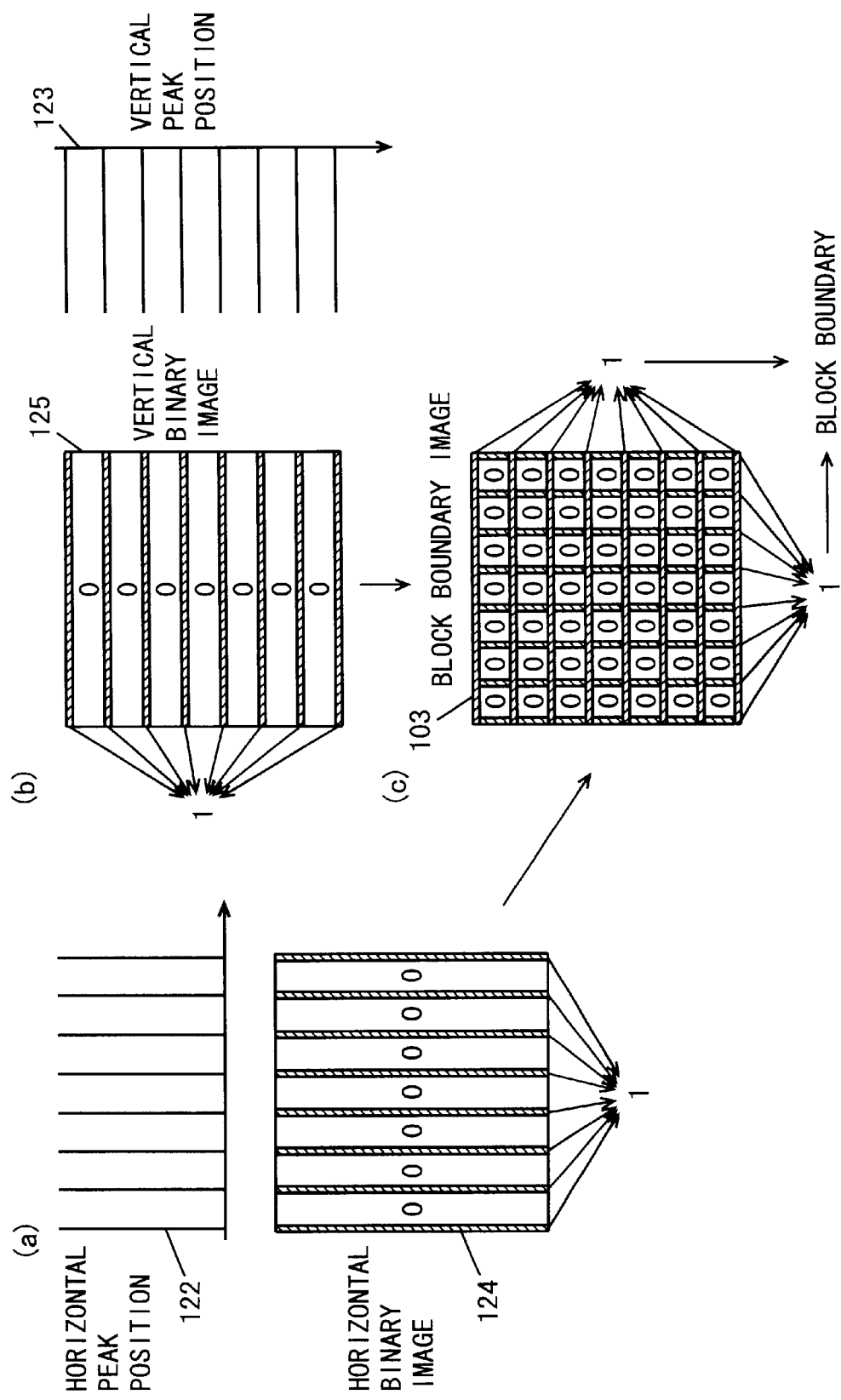
FIGS. 4(a)–(c) are diagrams illustrating how a binarization part 19 in FIG. 1 is operated.

FIGS. 4(a)–(c) are diagrams illustrating how the binarization part 19 in FIG. 1 is operated. Note that, FIG. 4(a) shows the horizontal peak position 122 and a horizontal binary image 124, FIG. 4(b) shows a vertical peak position 123 and a vertical binary image 125, and FIG. 4(c) shows a block boundary image 103 outputted from the binarization part 19.

Hereinafter, by referring to FIG. 1 to FIG. 4(c), it is described stepwise how the block noise detecting apparatus 10 according to the first embodiment of the present invention is operated.

A video signal is, in general, a signal obtained by one-dimensionally positioning three-dimensionally structured (horizontal/vertical/temporal) dynamic image data. A video signal 101 in the present invention is a one-frame image 112 being a two-dimensional video signal in the horizontal and vertical directions of one-frame time unit obtained in accordance with the above-described video signal, and also is a signal transmitted at a constant rate. In the one-frame image 112, as shown in FIG. 2, block images 113 are uniformly positioned in the horizontal and vertical directions, and each thereof includes block noise 114 in both directions. The block noise 114 periodically appears, as shown in FIG. 2, in the horizontal and vertical directions. Such video signal 101 is inputted into the vertical HPF 11 and horizontal HPF 12, respectively.

The vertical HPF 11 receives the video signal 101, and extracts only high frequency components in the vertical direction. The absolute value taking part 13 receives a signal outputted from the vertical HPF 11, and takes an absolute value thereof so as to change the value to a positive value. The horizontal accumulating/adding part 15 receives a signal outputted from the absolute value taking part 13, and performs accumulation/addition so as to output a vertical one-dimensional signal 116 periodically having a peak value in the vertical direction. On the other hand, the horizontal HPF 12 receives the video signal 101, and extracts only high frequency components in the horizontal direction. The absolute value taking part 14 receives a signal outputted from the horizontal HPF 12, and takes an absolute value thereof so as to change the value to a positive value. The vertical accumulating/adding part 16 receives a signal outputted from the absolute value taking part 14, and performs accumulation/addition so as to output the horizontal one-dimensional signal 115 periodically having a peak value in the horizontal direction.

The horizontal peak detecting part 18 detects a horizontal peak position in accordance with the horizontal one-dimensional signal 115 outputted from the vertical accumulating/adding part 16. It is now exemplarily described how the horizontal peak detecting part 18 detects the horizontal peak position by referring to FIGS. 3(a) and (b).

First, the horizontal peak detecting part 18 selects a detection region 119 (FIG. 3(a)) which is an arbitrary pixel range including three block boundary lines (about 30 pixels when the block size is 8) from the horizontal one-dimensional signal 115. Next, the horizontal peak detecting part 18 detects three data positions higher in an accumulation/addition level in the selected detection region 119 as peak positions. A difference among these detected peak positions is a block size in the horizontal direction. Hereinafter, the horizontal peak detecting part 18 makes a lateral move in the detection region 119 with spacing of the block size in the horizontal direction, and then detects each peak position so as to determine the horizontal peak position 122 as shown in FIG. 3(b).

The vertical peak detecting part 17 detects a vertical peak position according to the vertical one-dimensional signal 116 outputted from the horizontal accumulating/adding part 15. Note that, the vertical peak detecting part 17 detects the vertical peak position in a similar manner to the horizontal peak detecting part 18 for the horizontal peak position, and thus, an operation thereof is not described again. The vertical peak detecting part 17 determines the vertical peak position 123 as shown in FIG. 4(b).

When a format for the video signal 101 is an interlace system, peak positions of the vertical one-dimensional signal 116 outputted from the horizontal accumulating/adding part 15 may differ in even-numbered fields and odd-numbered fields. If the vertical peak detecting part 17 detects peak positions in the aforementioned manner without distinguishing between the even-numbered fields and odd-numbered fields, the vertical peak position 123 cannot be correct. Therefore, the vertical peak detecting part 17 externally receives a format identifying signal 102 relevant to the video signal 101. If judged that the format is interlace system, the vertical peak detecting part 17 detects peak positions separately for the even-numbered fields and odd-numbered fields so as to determine the vertical peak position 123 for the respective fields.

The binarization part 19 receives the horizontal peak position 122 outputted from the horizontal peak detecting part 18 and the vertical peak position 123 outputted from the vertical peak detecting part 17. The binarization part 19 provides, in accordance with the horizontal peak position 122, a logical value of "1" for each pixel position where the peak is, and provides a logical value of "0" for the remaining pixel positions, and then generates a horizontal binary image 124 in the same size as the one-frame image 112 (FIG. 4(a)). Further, the binarization part 19 provides, in accordance with the vertical peak position 123, the logical value of "1" for each pixel position where the peak is, and provides the logical value of "0" for the remaining pixel positions, and then generates a vertical binary image 125 in the same size as the one-frame image 112 (FIG. 4(b)). Thereafter, the binarization part 19 performs an OR operation for the horizontal binary image 124 and vertical binary image 125 so as to determine a block boundary image 103 (FIG. 4(c)).

In the block boundary image 103, a part having the logical value of "1" is the block boundary part, that is, where the block noise 114 arises.

As is known from the above, the block noise detecting apparatus 10 according to the first embodiment of the present invention can correctly detect a block boundary (block boundary image 103) of an image regionally divided into a plurality of blocks. Further, with respect to the video signal 101 whose format is interlace system, the block noise 114 can be correctly detected without deteriorating periodicity of the block image 113.

Second Embodiment

Figure 5:
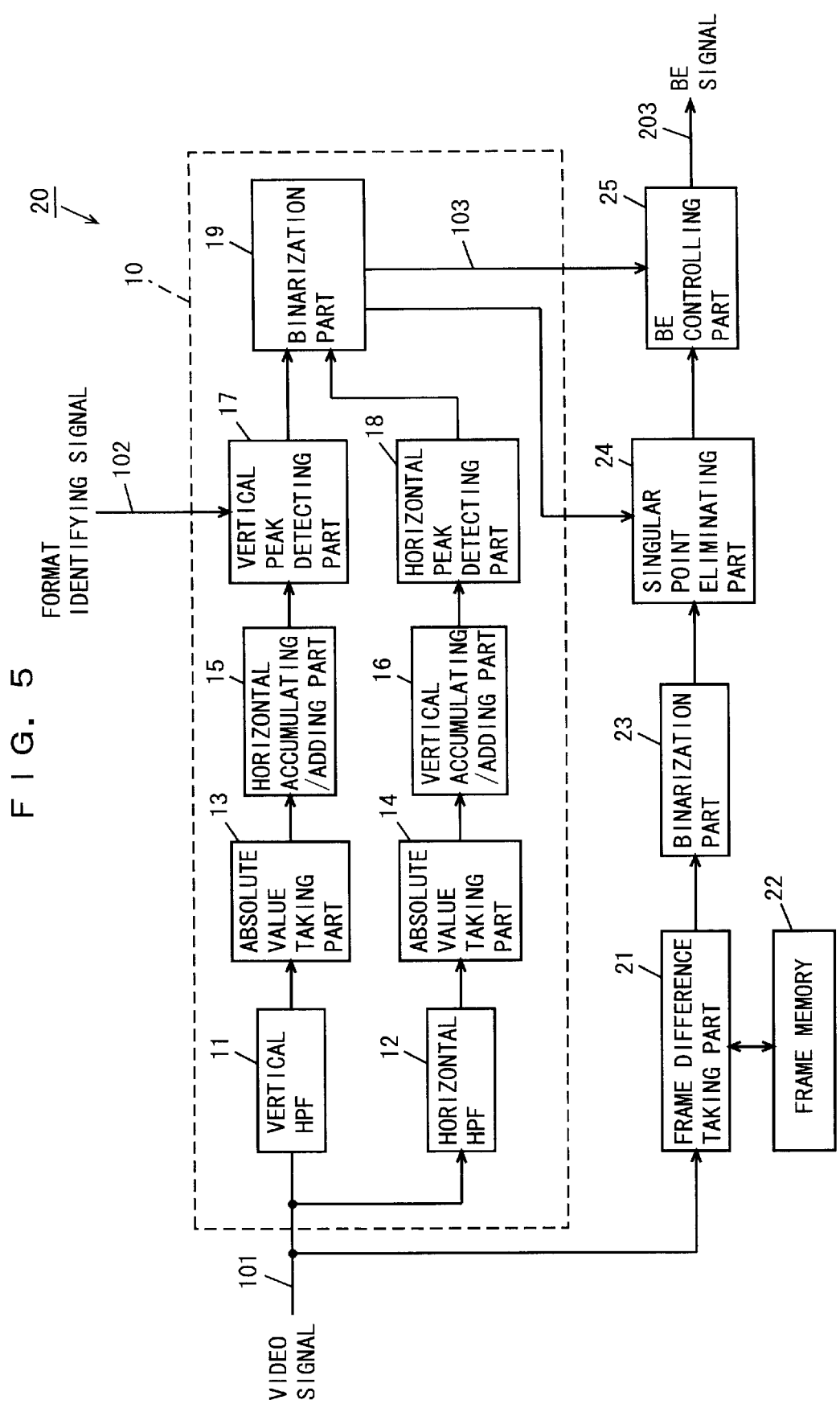
FIG. 5 is a block diagram showing the structure of a block noise detecting apparatus 20 according to a second embodiment of the present invention.

FIG. 5 is a block diagram showing the structure of a block noise detecting apparatus according to a second embodiment of the present invention. In FIG. 5, a block noise detecting apparatus 20 of the second embodiment is structured by the vertical HPF 11, the horizontal HPF 12, the absolute value taking parts 13 and 14, the horizontal accumulating/adding part 15, the vertical accumulating/adding part 16, the vertical peak detecting part 17, the horizontal peak detecting part 18, the binarization part 19, a frame difference taking part 21, a frame memory 22, a binarization part 23, a singular point eliminating part 24, and a block edge controlling part (hereinafter, referred to as BE controlling part) 25.

Note that, the block noise detecting apparatus 20 of the second embodiment and the block noise detecting apparatus 10 of the first embodiment are identical in the vertical HPF 11, horizontal HPF 12, absolute value taking parts 13 and 14, horizontal accumulating/adding part 15, vertical accumulating/adding part 16, vertical peak detecting part 17, horizontal peak detecting part 18, and binarization part 19. Therefore, those components are provided with the same reference numerals and are not described again.

Figure 6:
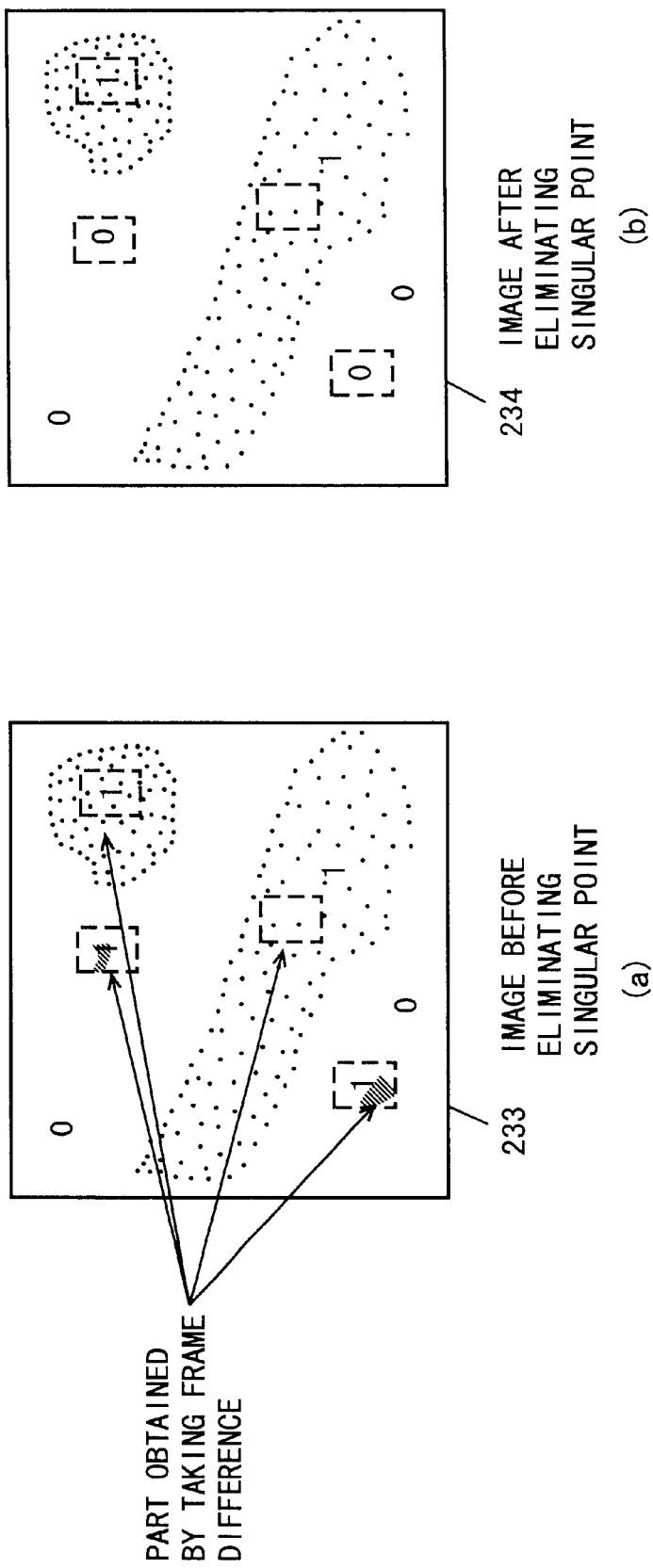
FIGS. 6(a) and (b) are diagrams exemplarily illustrating how a singular point eliminating part 24 in FIG. 5 is operated.

FIGS. 6(a) and (b) are diagrams exemplarily illustrating how the singular point eliminating part 24 in FIG. 5 is operated. Note that, FIG. 6(a) shows an image 233 outputted from the binarization part 23, singular points in which are to be eliminated, and FIG. 6(b) shows a singular-point-eliminated image 234 outputted from the singular point eliminating part 24.

Figure 7:
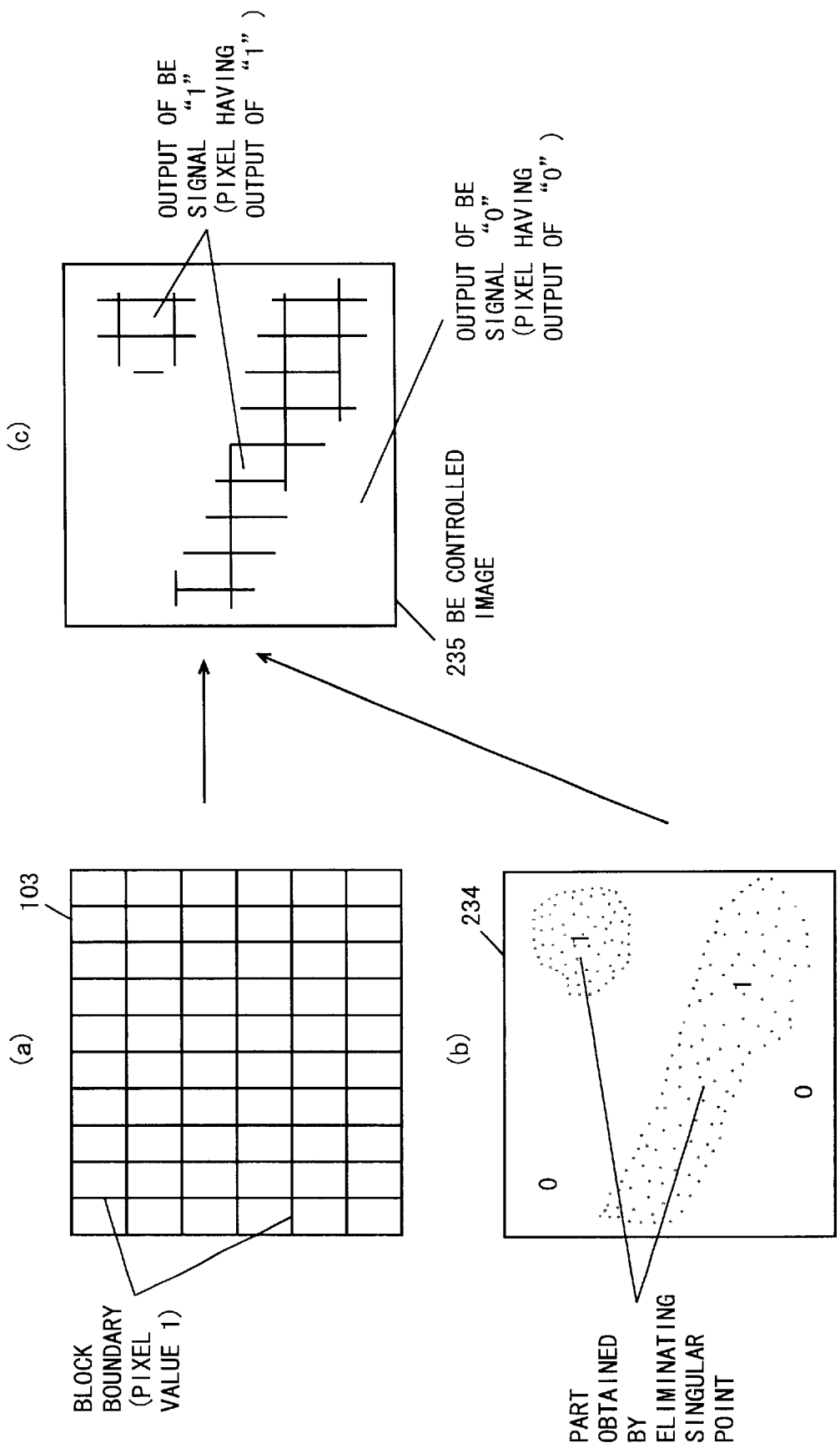
FIGS. 7(a) and (b) are diagrams exemplarily illustrating how a BE controlling part 31 in FIG. 5 is operated.

FIGS. 7(a)–(c) are diagrams exemplarily illustrating how the BE controlling part 31 in FIG. 5 is operated. Note that, FIG. 7(a) shows the block boundary image 103 outputted from the binarization part 19, FIG. 7(b) shows the singular-point-eliminated image 234 outputted from the singular point eliminating part 24, and FIG. 7(c) shows an image 235 after being subjected to BE control.

Hereinafter, by referring to FIG. 5 to FIG. 7(c), it is described stepwise how the block noise detecting apparatus 20 according to the second embodiment of the present invention is operated.

The video signal 101 is inputted into the frame difference taking part 21. First of all, the frame difference taking part 21 takes a difference in signal level between the inputted video signal 101 and another one-frame-before (a previous) video signal 101 stored in the frame memory 22 as a difference. Herein, in an initial state (a state in which the frame memory 22 in the activated block noise detecting apparatus 20 has nothing stored) of the frame difference taking part 21, only an storage operation for the frame memory 22 is carried out. Thereafter, the frame difference taking part 21 judges whether or not the difference is equal to or larger than a predetermined threshold value, and then outputs areas to the binarization part 23 only when the difference is equal to or larger than the threshold value. In this manner, through such processing by the frame difference taking part 21, only scenes having a large extent of image variation in the video signal 101 can be outputted. Note that, a level of the threshold value can be arbitrarily determined according to the desired image quality.

After outputting the difference areas to the binarization part 23, the frame difference taking part 21 stores the video signal 101 in the current frame into the frame memory 22. Thereafter, the frame difference taking part 21 repeats the above-described processing every time the part receives a new frame.

The binarizarion part 23 receives the difference areas outputted from the frame difference taking part 21. Then, in the one-frame image 112, the binarization part 23 provides the logical value of "1" for each pixel position where the difference is (singular point), and the logical value of "0" for the remaining pixel positions without the difference. In this manner, the singular-point-to-be-eliminated image 233 in FIG. 6(a) is obtained. Note that, the shaded and dotted parts in FIG. 6(a) are the pixel positions having the logical value of "1".

The singular point eliminating part 24 receives the singular-point-to-be-eliminated image 233 (FIG. 6(a)) from the binarization part 23, and a block size from the binarization part 19. Thereafter, the singular point eliminating part 24 eliminates, from the singular-point-to-be-eliminated image 233, data having the logical value of "1" observed in regions smaller than one block size (regions indicated by dashed lines in FIG. 6(a)). In this manner, the singular-point-eliminated image 234 in FIG. 6(b) is obtained.

The reason why singular point data is eliminated is as follows. The smaller regions in the singular-point-to-be-eliminated image 233 may not benefit from to-be-done noise elimination, but the noise elimination may smooth data and then blur images. Therefore, removing those smaller regions as singular points results in higher image quality.

Accordingly, the singular point eliminating part 24 effectively enhances frame difference processing, and the volume of data can be also reduced.

The BE controlling part 25 receives the block boundary image 103 (FIG. 7(a)) outputted from the binarization part 19 and the singular-point-eliminated image 234 (FIG. 7(b)) outputted from the singular point eliminating part 24. The BE controlling part 25 performs an AND operation by pixel, for the block boundary image 103 and the singular-point-eliminated image 234. In this manner, a BE controlled image 235 in FIG. 7(c) is obtained, and each pixel value in the BE controlled image 235 is a block edge signal (hereinafter, referred to as BE signal) 203. Accordingly, the BE signal 203 is on a block boundary and includes information telling that the block noise level is high.

As is known from the above, compared with the block noise detecting apparatus of the first embodiment, the block noise detecting apparatus 20 according to the second embodiment of the present invention can further classify a block boundary (block boundary image 103) by referring to the extent of image variation of images having block noise. As a result, it is possible to detect only parts having high block noise observed in visual scenes as the block boundary.

Third Embodiment

Figure 8:
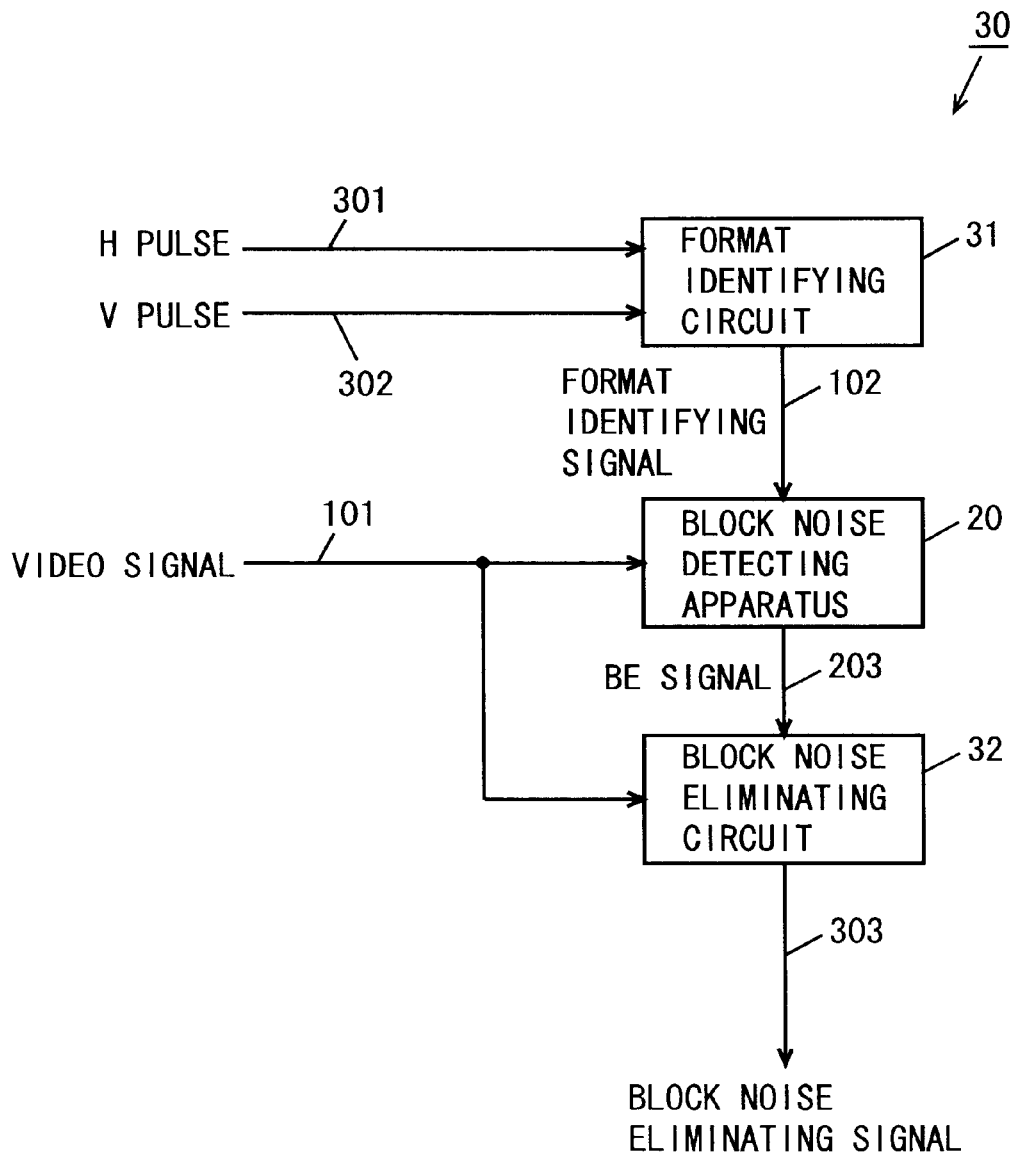
FIG. 8 is a block diagram showing the structure of a block noise eliminating apparatus 30 according to a third embodiment of the present invention.

FIG. 8 is a block diagram showing the structure of a block noise eliminating apparatus according to a third embodiment of the present invention. In FIG. 8, a block noise eliminating apparatus 30 of the third embodiment is structured by a format identifying circuit 31, the block noise detecting apparatus 20, and a block noise eliminating circuit 32.

The block noise detecting apparatus 20 in the block noise eliminating apparatus 30 of the third embodiment is identical to the block noise detecting apparatus 20 of the second embodiment. Therefore, components therein are provided with the same reference numerals and are not described again.

Figure 9:
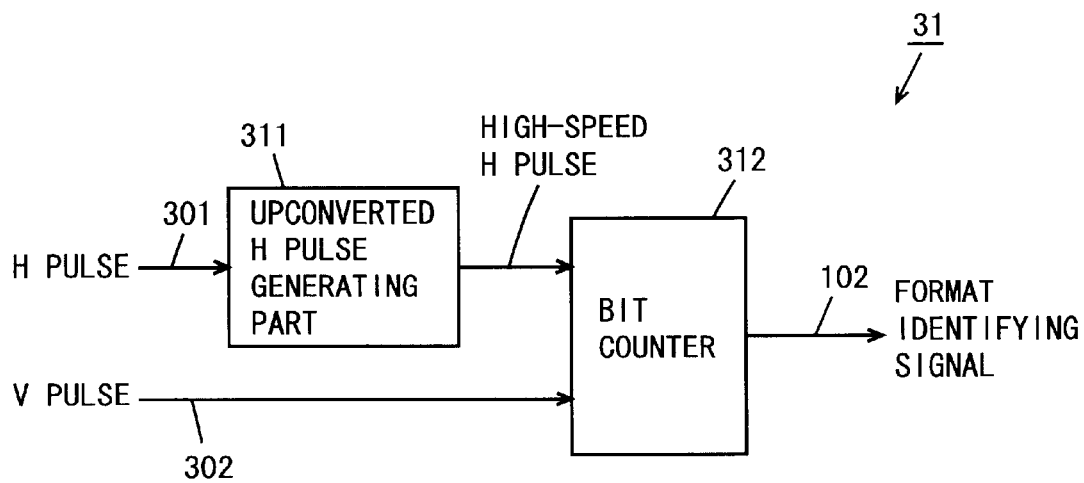
FIG. 9 is a block diagram exemplarily showing the structure of a format identifying circuit 31 in FIG. 8.

FIG. 9 is a block diagram exemplarily showing the structure of the format identifying circuit 31 in FIG. 8. In FIG. 9, the format identifying circuit 31 includes an upconverted H pulse generating part 311 and a bit counter 312.

Figure 10:
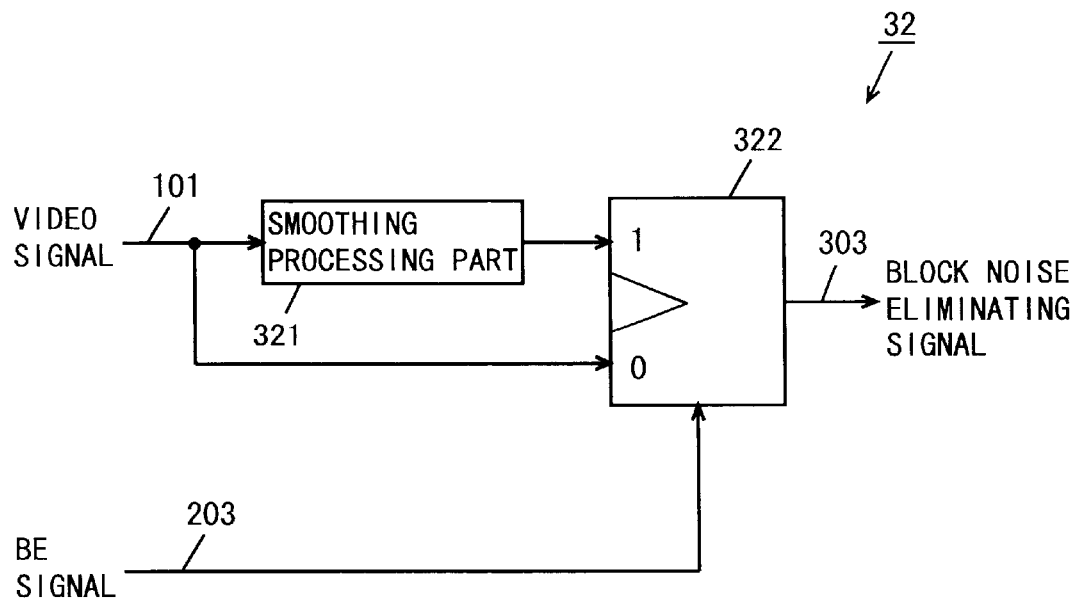
FIG. 10 is a block diagram exemplarily showing the structure of a block noise eliminating circuit 32 in FIG. 8.

FIG. 10 is a block diagram exemplarily showing the structure of the block noise eliminating circuit 32 in FIG. 8. In FIG. 10, the block, noise eliminating circuit 32 includes a smoothing processing part 321 and a selector 322.

FIGS. 11(a) and (b) are diagrams exemplarily illustrating smoothing processing carried out by the block noise eliminating circuit 32 in FIG. 8. Note that, FIG. 11(a) shows a state before smoothing (eliminate block noise) and FIG. 11(b) shows a state after smoothing.

Hereinafter, by referring to FIG. 8 to FIG. 11(b), it is described stepwise how the block noise eliminating apparatus 30 according to the third embodiment of the present invention is operated.

The block noise detecting apparatus 20 outputs the BE signal 203 from the received video signal 101 as described above. Herein, a luminance signal (Y signal) is most preferable for the video signal 101 to be inputted into the block noise detecting apparatus 20. The Y signal can be obtained by converting a decode video signal structured by red, green and blue (RGB) into a YUV signal structured by luminance and color-difference by using a matrix circuit, and then extracting only the Y signal therefrom (a well-known technique).

Referring to FIG. 9, the format identifying circuit 31 receives synchronizing pulses in the horizontal direction (hereinafter, referred to as H pulse) 301 and synchronizing pulses in the vertical direction (hereinafter, referred to as V pulse) 302 from a television signal. The upconverted H pulse generating part 311 receives the H pulse 301, and then generates an upconverted H pulse whose frequency is twice as high as that of the H pulse 301. The bit counter 312 receives the upconverted H pulse outputted from the upconverted H pulse generating part 311 and the V pulse 302, and then counts the number of times the upconverted H pulse is generated by using the V pulse 302 as a reset signal. In detail, the bit counter 312 counts the upconverted H pulse at intervals (V period) of generation of the V pulse 302. The bit counter 312 outputs the least significant bit of values counted in every V period to the block noise detecting apparatus 20 as the format identifying signal 102.

The reason why the format identifying signal 102 can be generated in such manner is as follows.

In the interlace system, generally, the number of lines in the V period is 262. 5. Accordingly, in a case with the interlace system, the bit counter 312 counts 525 times, twice as much as the number of lines, by using the upconverted H pulse. In the progressive system, on the other hand, the number of lines in the V period is 262 or 263. Accordingly, in the case with the progressive system, the bit counter 312 counts 524 times or 526 times, twice as much as the number of lines, by using the upconverted H pulse. Therefore, by judging whether or not the least significant bit of the values counted in every V period is an even number or an odd number, it is known that the odd number (that is, "5") refers to the interlace system and the even number (that is, "4" or "6") refers to the progressive system.

In more detail, the format identifying signal 102 outputted from the bit counter 312 is outputted in a form of a binary signal indicating the logical value of "1" (interlace system) and the logical value of "0" (progressive system).

Referring to FIG. 10, the block noise eliminating circuit 32 receives the video signal 101 and the BE signal 203 outputted from the block noise detecting apparatus 20. The smoothing processing part 321 receives the video signal 101 and smoothes the signal. The selector 322 receives the smoothed video signal outputted from the smoothing processing part 321, the video signal 101 without being smoothed, and the BE signal 203. Then, the selector 322 selects the smoothed signal as to a pixel in which the BE signal 203 has the logical value of "1" (block noise observed), and selects the not-smoothed video signal 101 as to a pixel in which the BE signal 203 has the logical value of "0" (block noise not observed). As is known from this, by using the BE signal 203, the block noise eliminating circuit 32 of the present invention executes such smoothing that reduces the block noise, but blurs edges of the video signal at the same time only on the block boundary where the block noise is observed.

The signal selected and outputted by the selector 322 is outputted as a block noise eliminating signal 303.

Figure 11:
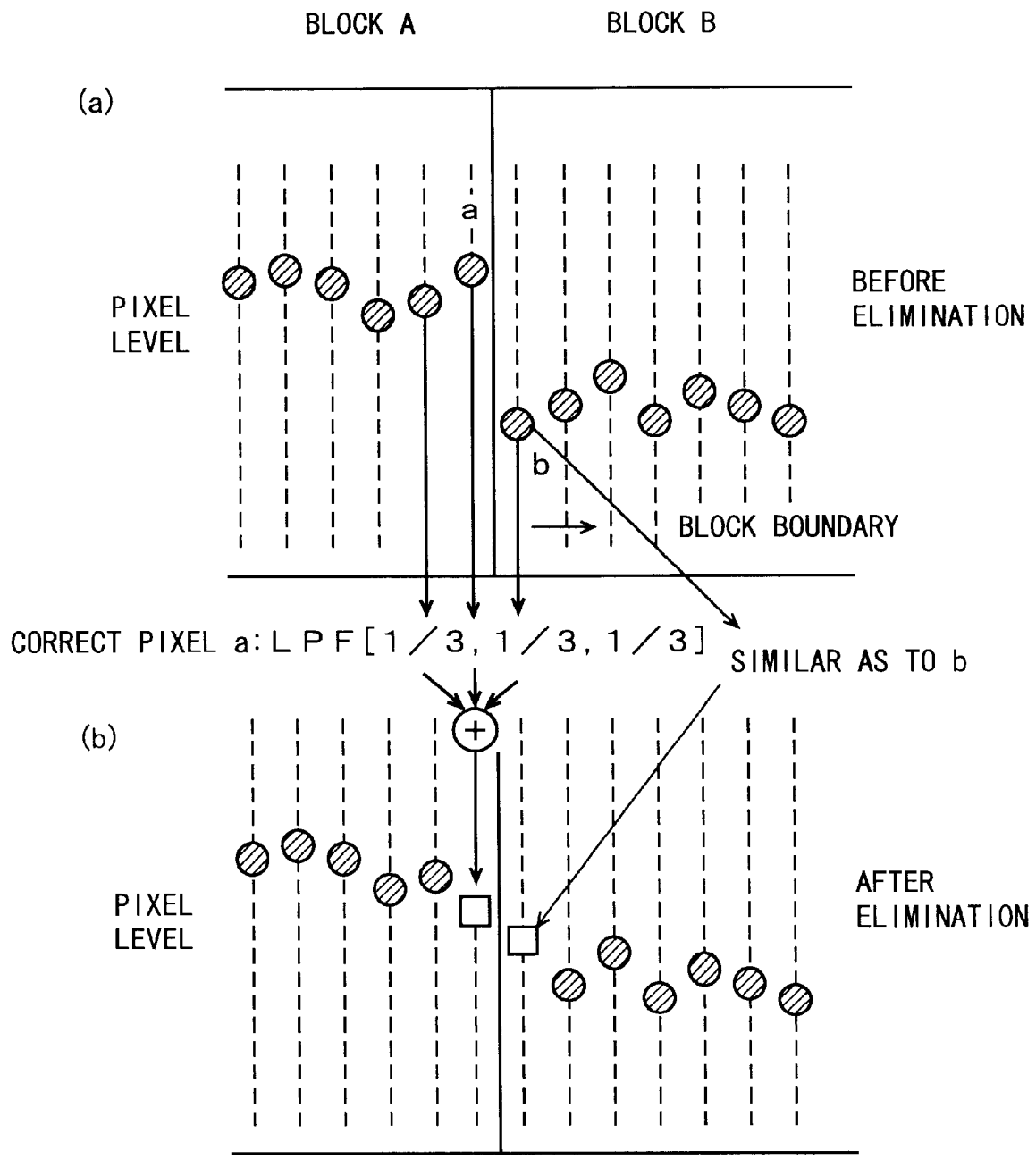
FIGS. 11(a) and (b) are diagrams exemplarily illustrating how the block noise eliminating circuit 32 in FIG. 8 executes smoothing processing.

FIGS. 11(a) and (b) exemplarily show smoothing executed by the smoothing processing part 321. In FIG. 11, smoothing is executed by using a low-pass filter (hereinafter, referred to as LPF) having "3" taps and each weighs ⅓, ⅓, and ⅓.

In FIG. 11(a), to smooth the block boundary where the BE signal has the logical value of "1", a pixel a on the right end of a block A and a pixel b on the left end in a block B adjoining to the block A are extracted and smoothed. As a result, as shown in FIG. 11(b), a difference in pixel level around the block boundary can be eliminated. To enhance the effects of the smoothing, the number of pixels to be extracted in the smoothing processing part 321 is set to 2 or more, or the number of taps of the LPF is increased, whereby the smoothing can be more effective.

When the block noise eliminating signal 303 outputted from the selector 322 is a Y signal, the Y signal can be converted back to an RGB signal by using an inverse matrix circuit with the aforementioned UV signal converted by the matrix circuit. In this manner, a block-noise-eliminated output video signal can be obtained (this is a known technique).

As is known from the above, the block noise eliminating apparatus 30, according to the third embodiment of the present invention, can be best matched to visual scenes and effectively eliminate block noise therein by using the BE signal 203 detected in the second embodiment.

Note that, in the third embodiment, the block noise detecting apparatus 20 of the second embodiment is used as a block noise detecting apparatus constituting the block noise eliminating apparatus 30. It is possible to use the block noise detecting apparatus 10 of the first embodiment as an alternative thereto.

Fourth Embodiment

Figure 12:
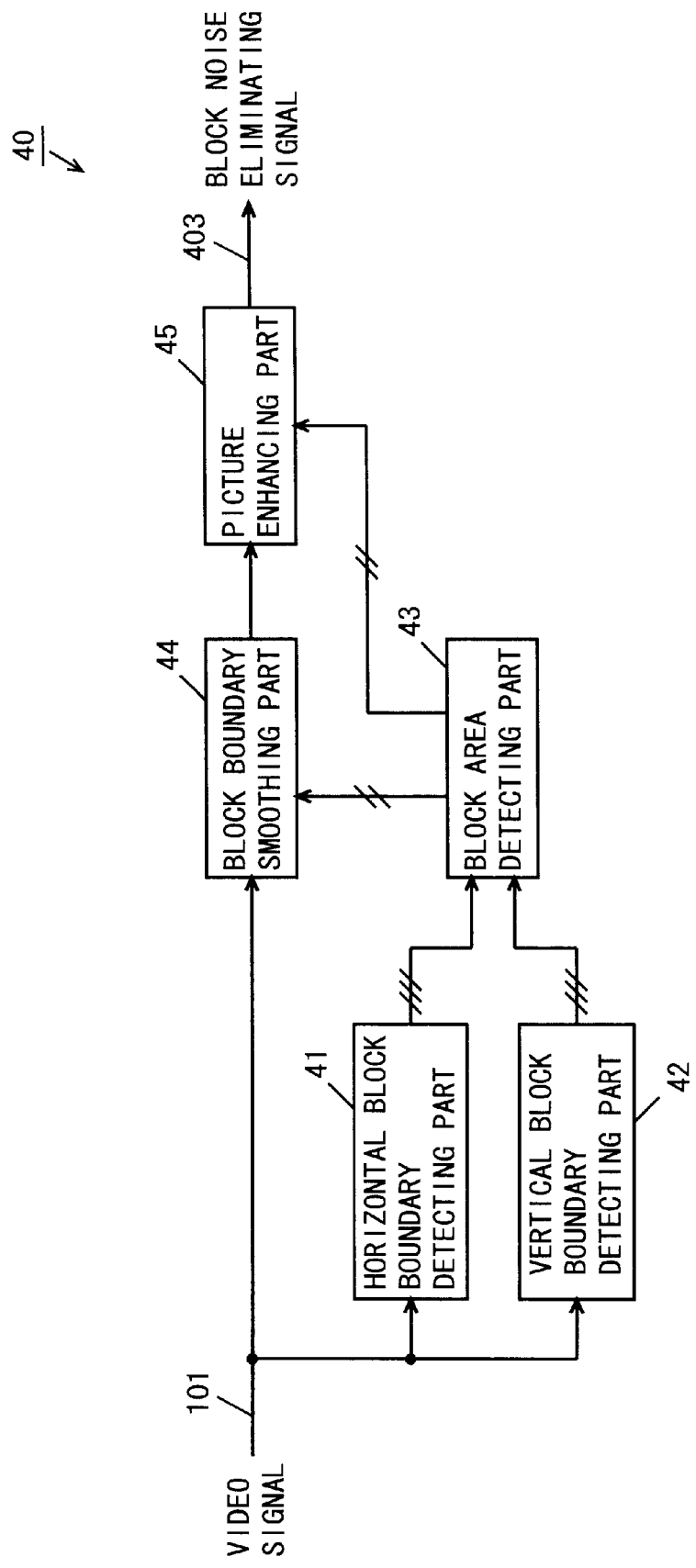
FIG. 12 is a block diagram showing the structure of a block noise eliminating apparatus 40 according to a fourth embodiment of the present invention.

FIG. 12 is a block diagram showing the structure of a block noise eliminating apparatus according to a fourth embodiment of the present invention. In FIG. 12, a block noise eliminating apparatus 40 of the fourth embodiment is structured by a horizontal block boundary detecting part 41, a vertical block boundary detecting part 42, a block area detecting part 43, a block boundary smoothing part 44, and a picture enhancing part 45.

Figure 13:
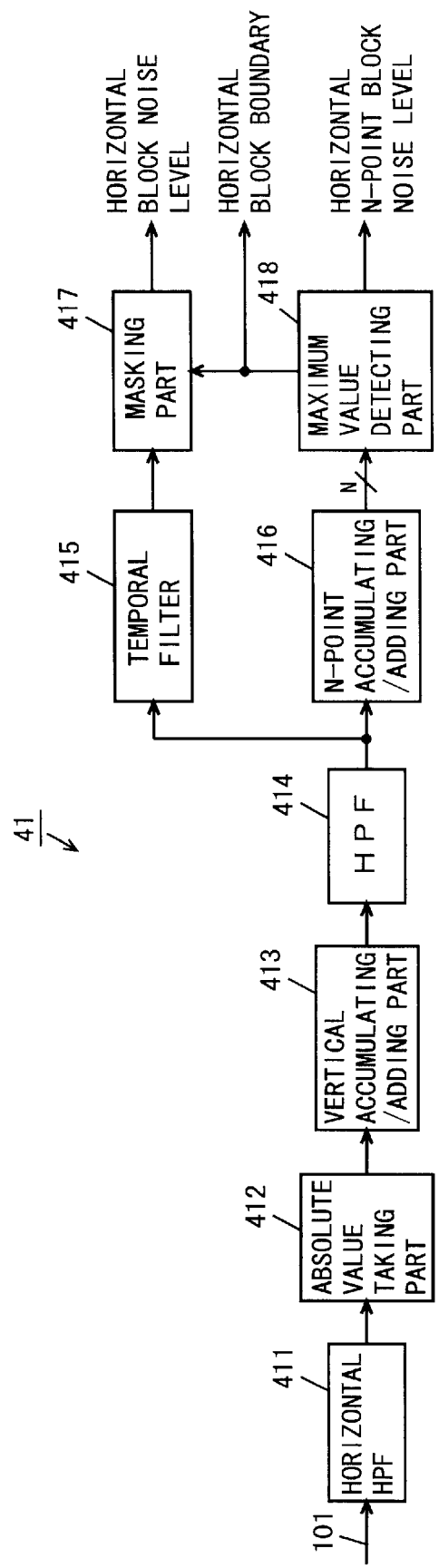
FIG. 13 is a block diagram exemplarily showing the structure of a horizontal block boundary detecting part 41 in FIG. 12.

FIG. 13 is a block diagram showing a more detailed structure of the horizontal block boundary detecting part 41 in FIG. 12. In FIG. 13, the horizontal block boundary detecting part 41 is structured by a horizontal HPF 411, an absolute value taking part 412, a vertical accumulating/adding part 413, a high-pass filter (hereinafter, referred to as HPF) 414, a temporal filter 415, an N-point accumulating/adding part 416, a masking part 417, and a maximum value detecting part 418.

Figure 14:
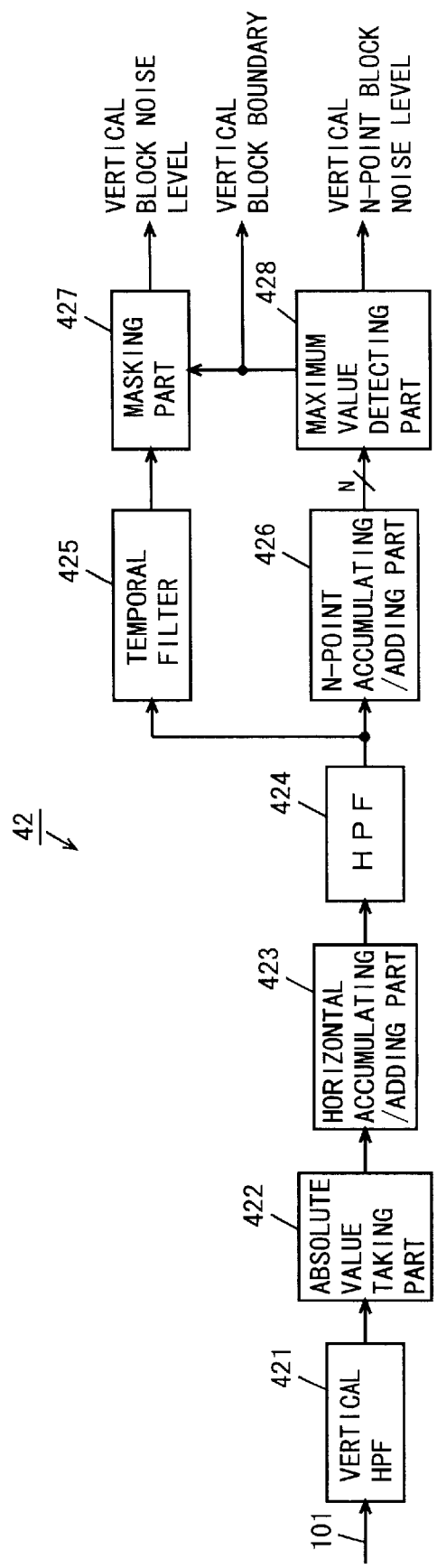
FIG. 14 is a block diagram exemplarily showing the structure of a vertical block boundary detecting part 42 in FIG. 12.

FIG. 14 is a block diagram showing a more detailed structure of the vertical block boundary detecting part 42 in FIG. 12. In FIG. 14, the vertical block boundary detecting part 42 is structured by a vertical HPF 421, an absolute value taking part 422, a horizontal accumulating/adding part 423, an HPF 424, a temporal filter 425, an N-point accumulating/adding part 426, a masking part 427, and a maximum value detecting part 428.

Figure 15:
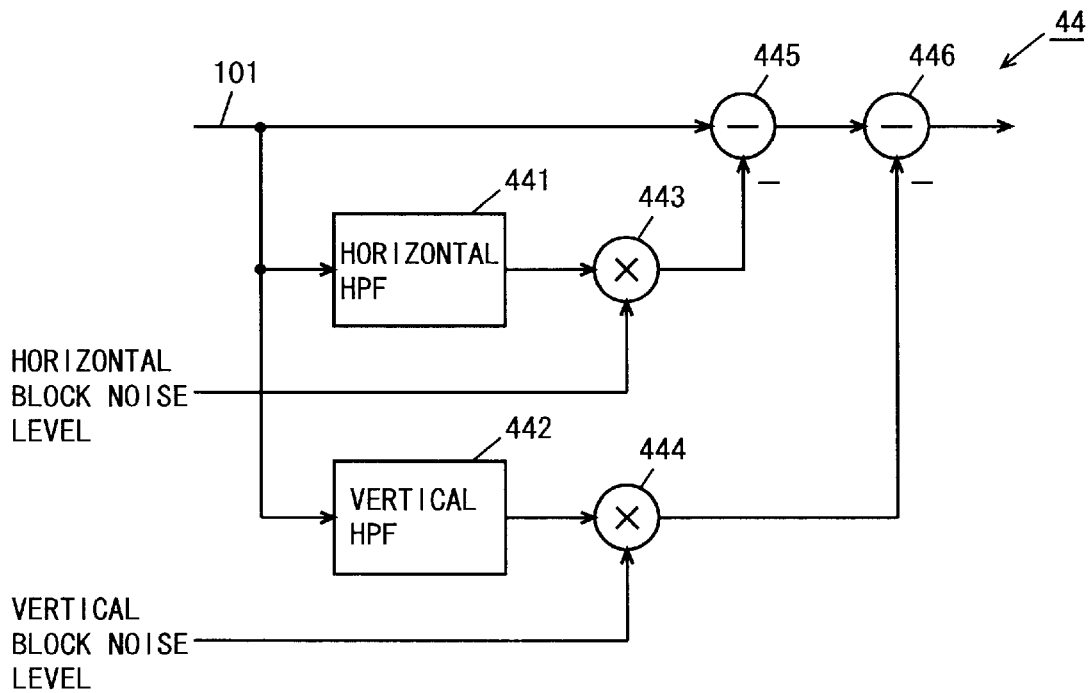
FIG. 15 is a block diagram exemplarily showing the structure of a block boundary smoothing part 44 in FIG. 12.

FIG. 15 is a block diagram showing the more detailed structure of the block boundary smoothing part 44 in FIG. 12. In FIG. 15, the block boundary smoothing part 44 is structured by a horizontal HPF 441, a vertical HPF 442, multiplying parts 443 and 444, and deducting (subtracting) parts 445 and 446.

Figure 16:
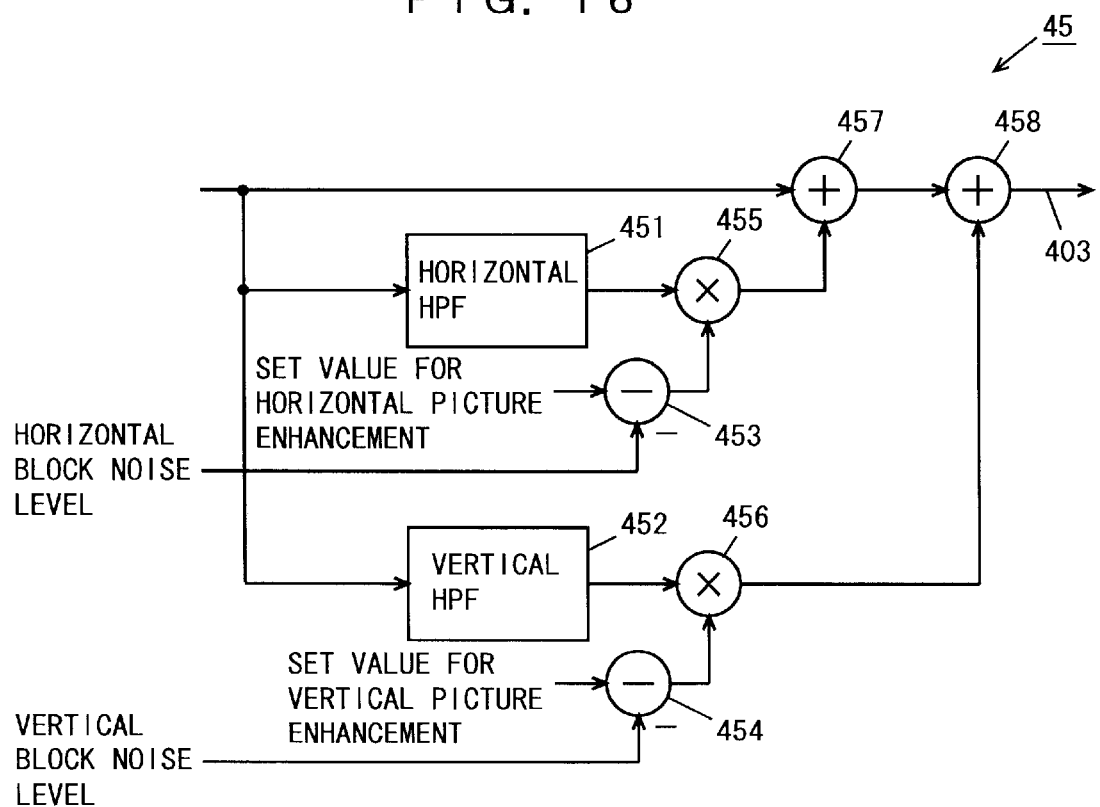
FIG. 16 is a block diagram exemplarily showing the structure of a picture enhancing part 45 in FIG. 12.

FIG. 16 is a block diagram showing a more detailed structure of the picture enhancing part 45 in FIG. 12. In FIG. 16, the picture enhancing part 45 is structured by a horizontal HPF 451, a vertical HPF 452, deducting (subtracting) parts 453 and 454, multiplying parts 455 and 456, and adding parts 457 and 458.

Hereinafter, by referring to FIG. 12 to FIG. 16, it is described stepwise how the block noise eliminating apparatus 40 according to the fourth embodiment of the present invention is operated.

The horizontal block boundary detecting part 41 detects a block noise level and a block boundary in the horizontal direction.

In FIG. 13, the horizontal HPF 411 receives the video signal 101, and then extracts only high frequency components in the horizontal direction. The absolute value taking part 412 receives a signal outputted from the horizontal HPF 411, and takes an absolute value thereof so as to change the value to a positive value. The vertical accumulating/adding part 413 receives a signal outputted from the absolute value taking part 412, and performs accumulation/addition so as to output the horizontal one-dimensional signal 115 having a peak value at horizontal intervals (see FIG. 2). The HPF 414 extracts high frequency components for the purpose of improving accuracy of the signal outputted from the vertical accumulating/adding part 413, and then detects a horizontal block noise level. The temporal filter 415 extends the horizontal block noise level outputted from the HPF 414 in the temporal direction. The N-point accumulating/adding part 416 accumulates/adds and outputs noise observed in every predetermined N-point (where N indicates the number of pixels in a block), that is, noise observed at the same pixel position in each block. The maximum value detecting part 418 determines a maximum value of the N-point and a block boundary in the horizontal direction. Herein, in a case where the block noise arises at 8 (pixels)×8 (lines) intervals in MPEG2, the maximum value detecting part 418 sets N of the N-point accumulating/adding part 416 to "8", and determines the horizontal block boundary. The masking part 417 masks the horizontal block noise level outputted from the temporal filter 415 on the horizontal boundaries determined by the maximum value detecting part 418, and then outputs only the horizontal block noise level observed on the horizontal block boundary.

Note that, to detect the horizontal block noise in a very accurate manner, a coring device passing only signals with a small amplitude may be inserted into an output signal path of the horizontal HPF 411 or the absolute value taking part 412.

The vertical block boundary detecting part 42 detects a block noise level and block boundary in the vertical direction in a similar manner to the horizontal block boundary detecting part 41.

In FIG. 14, the horizontal HPF 421 receives the video signal 101, and extracts only high frequency components in the vertical direction. The absolute value taking part 422 receives a signal outputted from the vertical HPF 421, and takes an absolute value thereof so as to change the value to a positive value. The horizontal accumulating/adding part 423 receives a signal outputted from the absolute value taking part 422, and performs accumulation/addition so as to output the vertical one-dimensional signal 116 having a peak value at vertical intervals (see FIG. 2). The HPF 424 extracts high frequency components for the purpose of improving accuracy of the signal outputted from the horizontal accumulating/adding part 423, and then detects a vertical block noise level. The temporal filter 425 extends the vertical block noise level outputted from the HPF 424 in the temporal direction. The N-point accumulating/adding part 426 accumulates/adds and outputs noise observed in every predetermined N-point. The maximum value detecting part 428 determines a maximum value of the N-point and block boundary in the vertical direction. Herein, in a case where the block noise arises at 8×8 intervals in MPEG2, for example, the maximum value detecting part 428 sets N of the N-point accumulating/adding part 426 to "8", and determines the vertical block boundary. The masking part 427 masks the vertical block noise level outputted from the temporal filter 425 on the vertical block boundary determined by the maximum value detecting part 428, and then outputs only the vertical block noise level observed on the vertical block boundary.

Note that, as is done in the foregoing, a coring device passing only signals that are small in amplitude may be inserted into an output signal path of the vertical HPF 421 or the absolute value taking part 422 to detect the vertical block noise in a very accurate manner.

The block area detecting part 43 detects where the block noise arises in which level from each signal on the block noise levels in the vertical and horizontal directions, the N-point block noise level, and the block boundary outputted from the horizontal block boundary detecting part 41 and the vertical block boundary detecting part 42.

The block boundary smoothing part 44 smoothes the video signal according to the block noise level signals in the vertical/horizontal directions outputted from the block area detecting part 43.

Referring to FIG. 15, the block boundary smoothing part 44 extracts high frequency components in the horizontal direction from the received video signal 101 by using the horizontal HPF 441. Thereafter, the block boundary smoothing part 44 multiplies the extracted horizontal high frequency components and the horizontal block noise level in the multiplying part 443, and then deducts that product from the video signal 101 in the deducting part 445. The same processing is also executed to the vertical direction, and the block boundary smoothing part 44 extracts high frequency components in the vertical direction from the received video signal 101 by using the vertical HPF 442. The block boundary smoothing part 44 multiplies the extracted vertical high frequency components and the vertical block noise level in the multiplying part 444, and then deducts that product from the video signal 101 in the deducting part 446.

In this manner, the larger the block noise levels in the horizontal/vertical directions, the greater extent the video signal 101 is smoothed.

The picture enhancing part 45 changes a gain/coring volume for picture enhancement, for example, in accordance with the block noise level signals in the horizontal/vertical directions outputted from the block area detecting part 43.

Referring to FIG. 16, the picture enhancing part 45 extracts high frequency components in the horizontal direction from the received video signal 101 by using the horizontal HPF 451. Thereafter, the picture enhancing part 45 deducts the horizontal block noise level from a set value for the horizontal picture enhancement in the deducting part 453, multiplies the extracted horizontal high frequency components and the horizontal block noise level in the multiplying part 455, and then adds that product to the video signal 101 in the adding part 457. The same processing is also executed to the vertical direction, and the picture enhancing part 45 extracts high frequency components in the vertical direction from the received input signal 101 by using the vertical HPF 452. Thereafter, the picture enhancing part 45 deducts the vertical block noise level from the set value for the vertical picture enhancement in the deducting part 454, multiplies the extracted vertical high frequency components and the vertical block noise level in the multiplying part 456, and then adds that product to the video signal 101 in the adding part 458.

In this manner, the larger the block noise levels in the horizontal/vertical directions, the greater extent the gain of the horizontal/vertical picture enhancement is reduced with respect to the video signal 101, thereby allowing the picture enhancement to be done without emphasizing the block noise.

Typically, a CPU (central processing unit) controls operation of the block noise eliminating apparatus 40 according to the fourth embodiment of the present invention. If this is the case, the CPU may receive output results of the N-point accumulating/adding parts 416 and 426, detect where the block boundary is, and then control the masking parts 417 and 427. Further, the CPU may receive the detected block noise level and the block boundary, and instruct and control picture enhancement level or noise elimination level on a screen. Still further, after the block noise is detected, a judgement result made on types of input sources such as "DVD/DVC/digital" or quality of video signal (MPEG, for example) can be on-screen-displayed (hereinafter, referred to as OSD).

As is known from this, the block noise eliminating apparatus 40 according to the fourth embodiment of the present invention can accurately detect the block boundary and block noise level. As a result, smoothing or picture enhancement can be properly done corresponding to the block noise level, and accordingly, the block noise can be eliminated more effectively for the best match to visual scenes. Further, by OSD displaying information, video sources or effects of block noise elimination can be acknowledged at a glance.

Fifth Embodiment

When the block noise eliminating apparatus of the fourth embodiment is presumably provided for a television system, for example, the video signal 101 to be inputted may include a video signal in a different signal form being inputted from an external terminal in addition to a normal television video signal.

Therefore, a fifth embodiment is to provide a block noise eliminating apparatus corresponding to input video signals in various signal forms.

Figure 17:
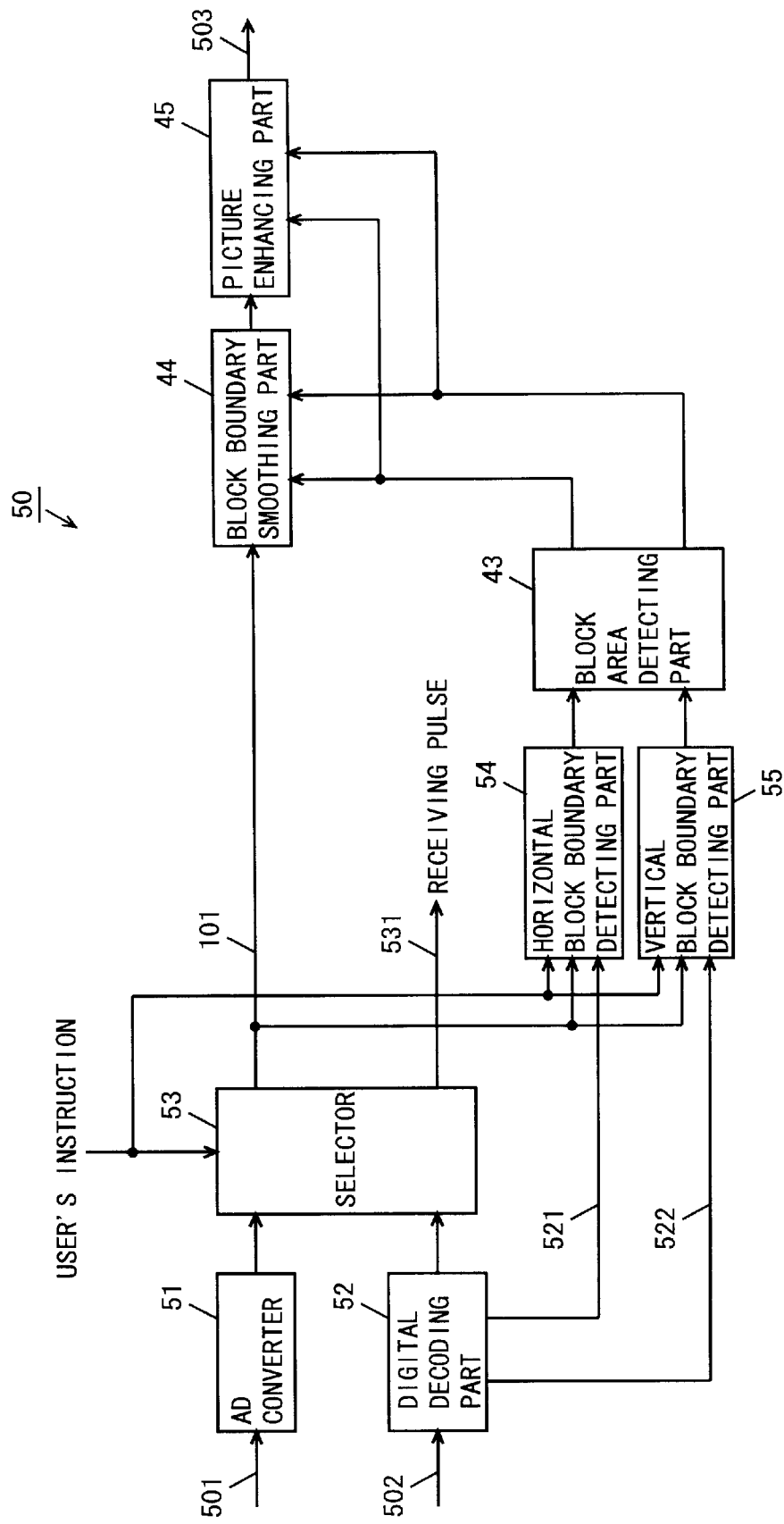
FIG. 17 is a block diagram showing the structure of a block noise eliminating apparatus 50 according to a fifth embodiment of the present invention.

FIG. 17 is a block diagram showing the structure of a block noise eliminating apparatus according to a fifth embodiment of the present invention. In FIG. 17, a block noise eliminating apparatus 50 of the fifth embodiment is structured by an AD converter 51, a digital decoding part 52, a selector 53, a horizontal block boundary detecting part 54, a vertical block boundary detecting part 55, the block area detecting part 43, the block boundary smoothing part 44, and the picture enhancing part 45.

FIG. 18 is a block diagram showing a more detailed structure of the horizontal block boundary detecting part 54 in FIG. 17. In FIG. 18, the horizontal block boundary detecting part 54 is structured by the horizontal HPF 411, the absolute value taking part 412, the vertical accumulating/adding part 413, the HPF 414, the temporal filter 415, the N-point accumulating/adding part 416, the masking part 417, the maximum value detecting part 418, and a selector 541.

Figure 19:
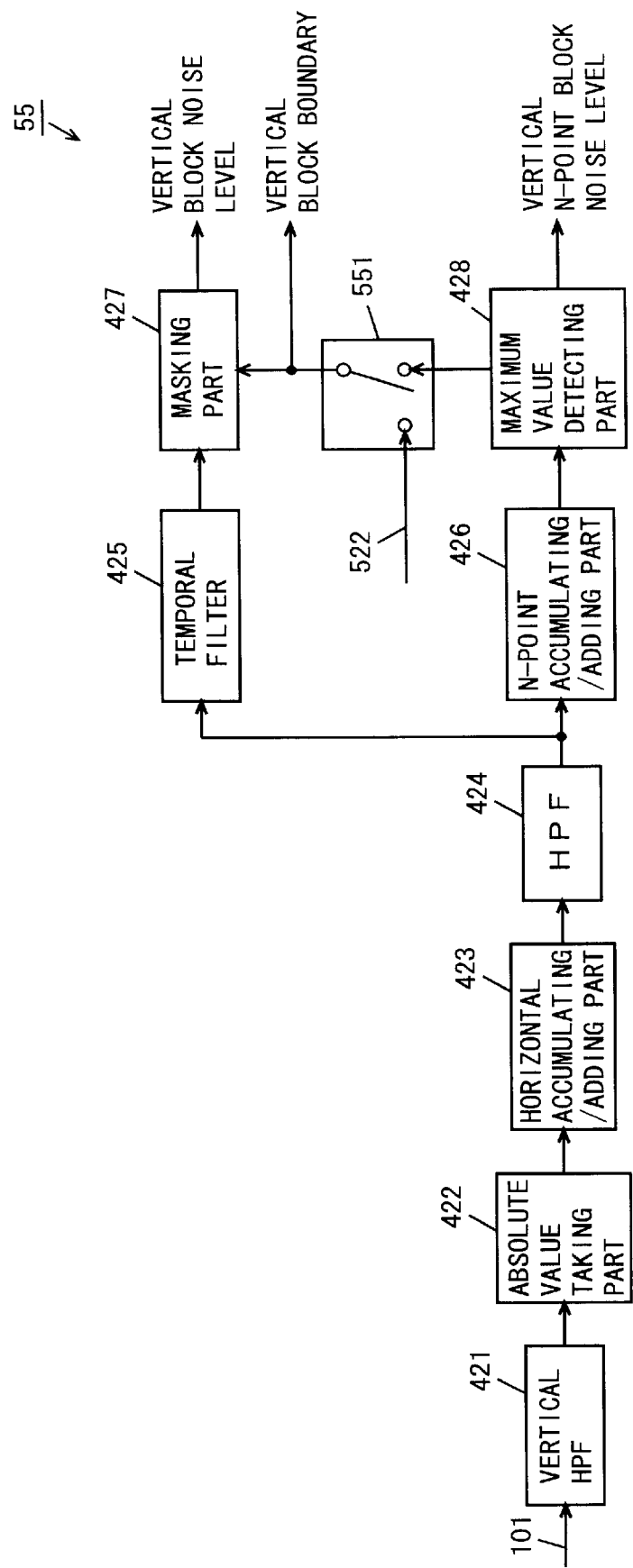
FIG. 19 is a block diagram exemplarily showing the structure of a vertical block boundary detecting part 55 in FIG. 17.

FIG. 19 is a block diagram showing the more detailed structure of the vertical block boundary detecting part 55 in FIG. 17. In FIG. 19, the vertical block boundary detecting part 55 is structured by the vertical HPF 421, the absolute value taking part 422, the horizontal accumulating/adding part 423, the HPF 424, the temporal filter 425, the N-point accumulating/adding part 426, the masking part 427, the maximum value detecting part 428, and a selector 55 1.

Herein, the block noise eliminating apparatus 50 of the fifth embodiment and the block noise eliminating apparatus 40 of the fourth embodiment are identical in the block area detecting part 43, the block boundary smoothing part 44, and the picture enhancing part 45. Therefore, those components are provided with the same reference numerals and not described again.

The horizontal block boundary detecting part 54 is identical to the horizontal block boundary detecting part 41 described in the fourth embodiment, but additionally has the selector 541 therein, and the vertical block boundary detecting part 55 is identical to the vertical block boundary detecting part 42 described in the fourth embodiment, but additionally has the selector 551. Therefore, the same components are under identical reference numerals and are not described again.

Hereinafter, referring to FIG. 17 to FIG. 19, it is described stepwise how the block noise eliminating apparatus 50 according to the fifth embodiment of the present invention is operated.

The AD converter 51 receives an analog video signal 501. The digital decoding part 52 receives, a digital video signal 502 in an MPEG stream or DV format to be connected according to IEEE 1394 standards, for example. The AD converter 51 A/D converts the received analog video signal 501, and outputs the same to the selector 53. The digital decoding part 52 decodes the received digital video signal 502 and outputs the same to the selector 53. The digital decoding part 52 can output block information signals 521 and 522 (that is, block boundary) indicating a block size where the video signal 502 is decoded.

The selector 53 selects either one of the inputted two digital video signals as instructed by a user, and then outputs the same as the video signal 101. Herein, the selector 53 outputs a receiving pulse 531 indicating which digital video signal is selected and outputted. When an output of the AD converter 51 is selected (input is presumably a DVD analog signal), the logical value of "0" is outputted as the receiving pulse 53 1, and when an output of the digital decoding part 52 is selected (input is presumably a digital signal of a digital video camera (DVC)), the logical value of "1" is outputted. The receiving pulse 531 can, for example, be utilized as information for OSD indicating what was received. In the above example, characters such as "DVD" or "DVC" can be OSD on a television screen.

The video signal 101 selected in the selector 53 and the block information signals 521 and 522 outputted from the digital decoding part 52 are to be inputted into the horizontal block boundary detecting part 54 and the vertical block boundary detecting part 55.

The horizontal block boundary detecting part 54 detects the block noise level and block boundary in the horizontal direction as is described in the foregoing as a matter of principle. The maximum value detecting part 418 outputs the determined horizontal block boundary to the selector 541. The selector 541 receives the horizontal block boundary outputted from the maximum value detecting part 418 and the block information signal 521 outputted from the digital decoding part 52. Thereafter, the selector 541 selects and outputs, as is instructed by the user (synchronizes with the user's instruction to the selector 53), the horizontal block boundary determined by the maximum value detecting device 418 when the selector 53 selected the output signal of the AD converter 51, and selects and outputs the horizontal block boundary provided as the block information signal 521 when the selector 53 selected the output signal of the digital decoding part 52.

In a similar manner, the vertical block boundary detecting part 55 detects the block noise level and the block boundary in the vertical direction, as is described in the foregoing as a matter of principle, while the maximum value detecting part 428 outputs the determined vertical block boundary to the selector 551. The selector 551 receives the vertical block boundary outputted from the maximum value detecting part 428 and the block information signal 522 outputted from the digital decoding part 52. Thereafter, as is instructed by the user (synchronizes with the user's instruction to the selector 53), the selector 551 selects and outputs the vertical block boundary determined by the maximum value detecting device 428 when the selector 53 selected an output signal of the AD converter 5 1, and selects and outputs the vertical block boundary provided as the block information signal 522 when the selector 53 selects the output signal of the digital decoding part 52.

In this manner, when the analog video signal 501 whose block boundary is not clearly identified is inputted, the block boundary determined by the horizontal block boundary detecting part 54 and the vertical block boundary detecting part 55 are used to eliminate the block noise, and when the digital video signal 502 whose block boundary can be identified (provided) is inputted, the block boundary is used to eliminate the block noise.

As is clear from the above, the block noise eliminating apparatus 50 according to the fifth embodiment of the present invention can correctly detect the block boundary and block noise level corresponding to the to-receive video signal. As a result, smoothing or picture enhancement can be properly done corresponding to the block noise level, and accordingly, the block noise can be eliminated more effectively for the best match to visual scenes. Further, by OSD displaying information, video sources or effects of block noise elimination can be acknowledged at a glance.

Sixth Embodiment

Other than the block noise, a dot clock not properly regenerated may degrade a video signal in image quality. The dot clock not properly regenerated is caused, at the time of A/D conversion for the video signal, by a phase shift between a clock phase sampled by an analog video signal and a clock phase sampled by a digital-converted video signal as is well known.

Therefore, a sixth embodiment of the present invention is to correctly regenerate the dot clock by applying the aforementioned technique for detecting the block boundary.

Figure 20:
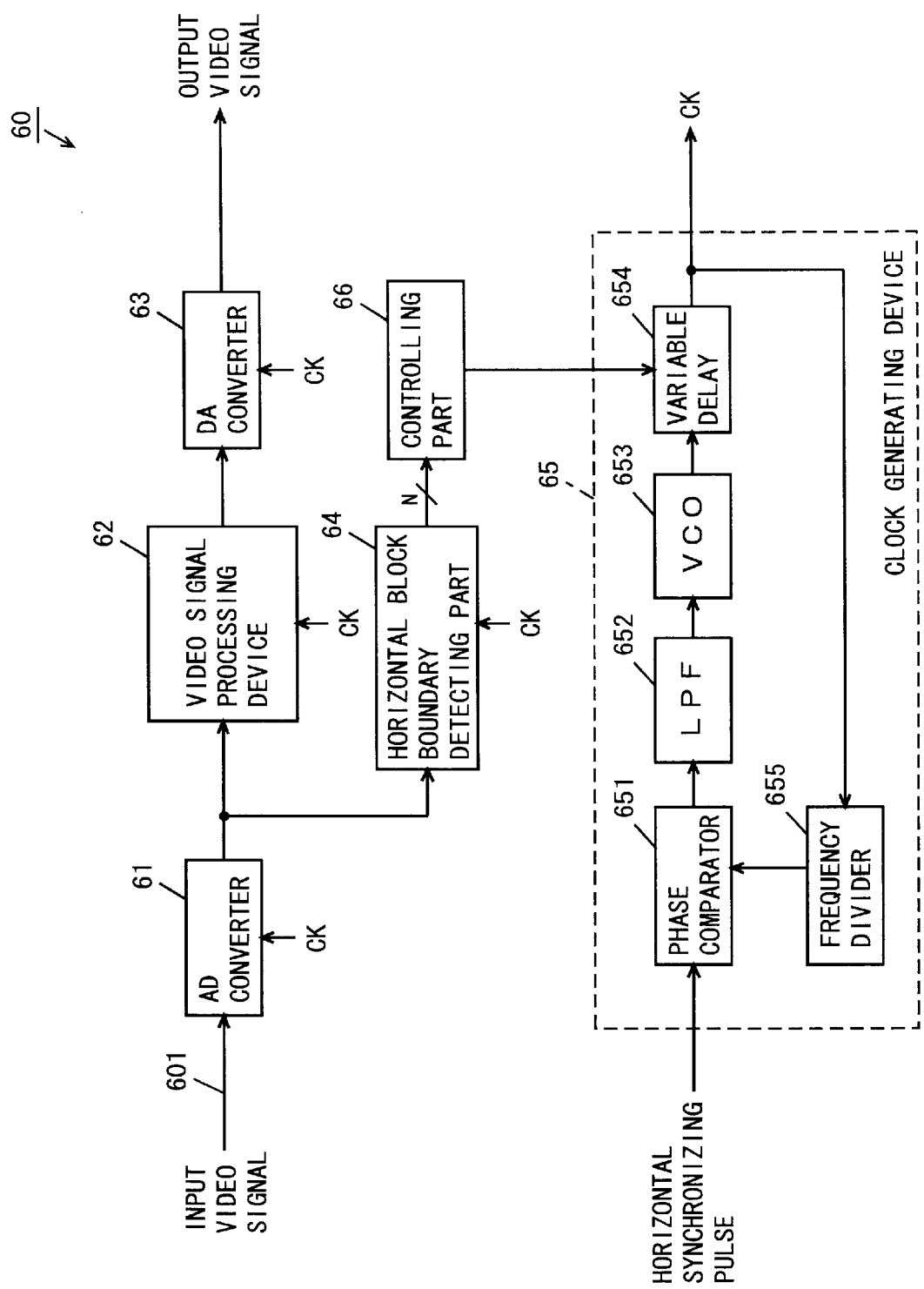
FIG. 20 is a block diagram showing the structure of a dot clock detecting apparatus 60 according to a sixth embodiment of the present invention.

FIG. 20 is a block diagram exemplarily showing the structure of a video processing system using a block detecting apparatus according to a sixth embodiment of the present invention. In FIG. 20, a video processing system 60 using the block detecting apparatus of the sixth embodiment is structured by an AD converter 61, a video signal processing device 62, a DA converter 63, a horizontal block boundary detecting part 64, a clock generating device 65, and a controlling part 66. The clock generating device 65 is structured by a phase comparator 651, an LPF 652, a VCO 653, a variable delay 654, and a frequency divider 655.

Figure 21:
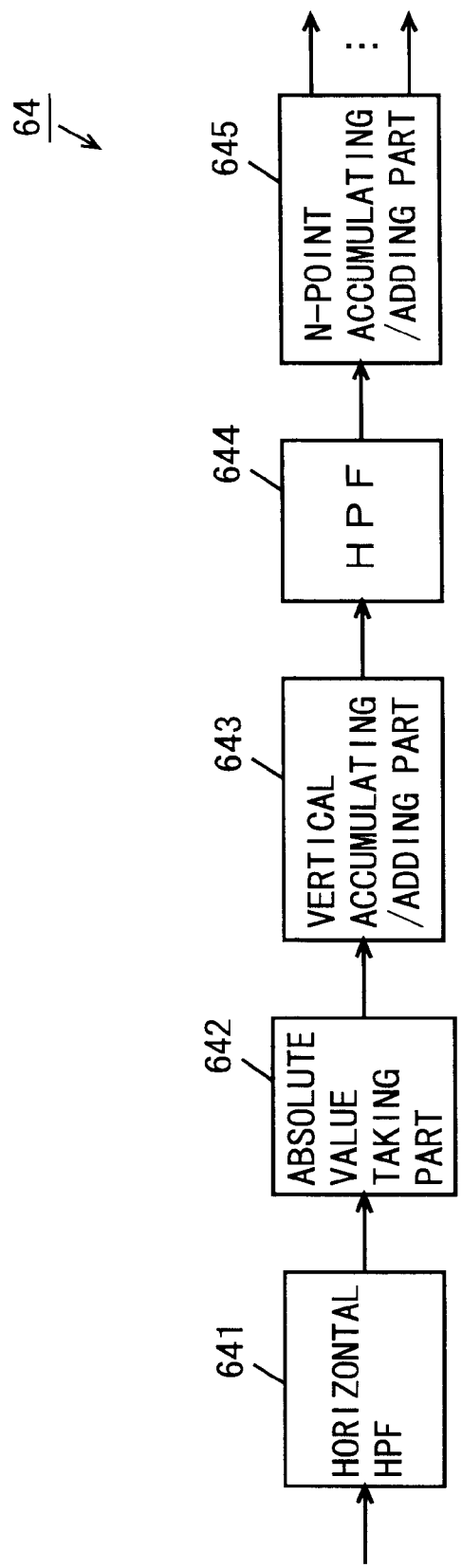
FIG. 21 is a block diagram exemplarily showing the structure of a horizontal block boundary detecting part 64 in FIG. 20.

FIG. 21 is a block diagram showing the more detailed structure of the horizontal block boundary detecting part 64 in FIG. 20. In FIG. 21, the horizontal block boundary detecting part 64 is structured by a horizontal HPF 641, an absolute value taking part 642, a vertical accumulating/adding part 643, an HPF 644, and a N-point accumulating/adding part 645.

Figure 22:
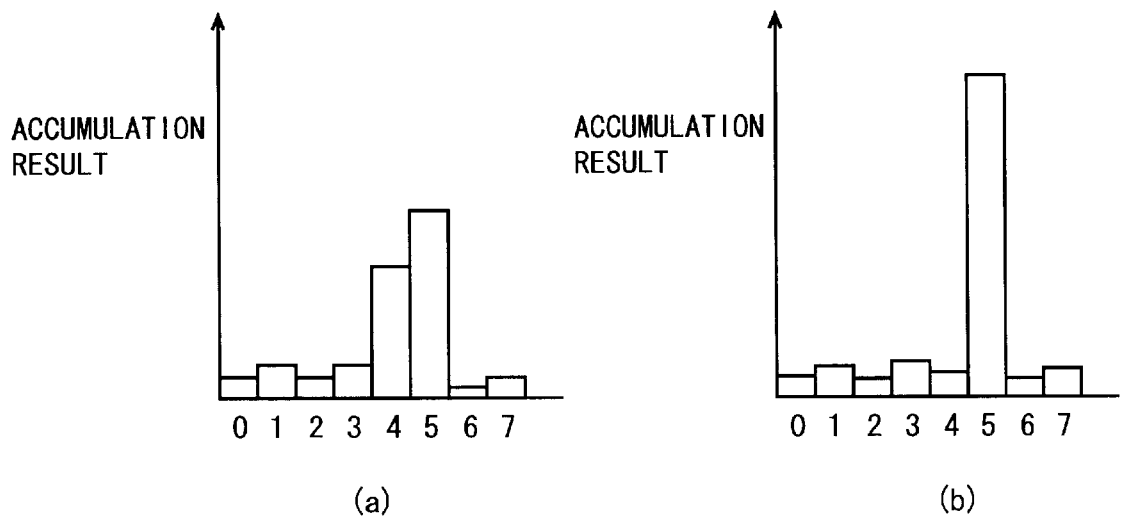
FIGS. 22(a) and (b) are diagrams exemplarily showing an accumulation/addition result of horizontal block noise outputted from the horizontal block boundary detecting part 64 in FIG. 20.

FIGS. 22(*a*) and (*b*) are diagrams exemplarily showing an accumulation/addition result of the horizontal block noise outputted from the horizontal block boundary detecting part 64 in FIG. 20. Note that, the accumulation/addition result shown in FIGS. 22(*a*) and (*b*) is obtained when N is "8".

Figure 23:
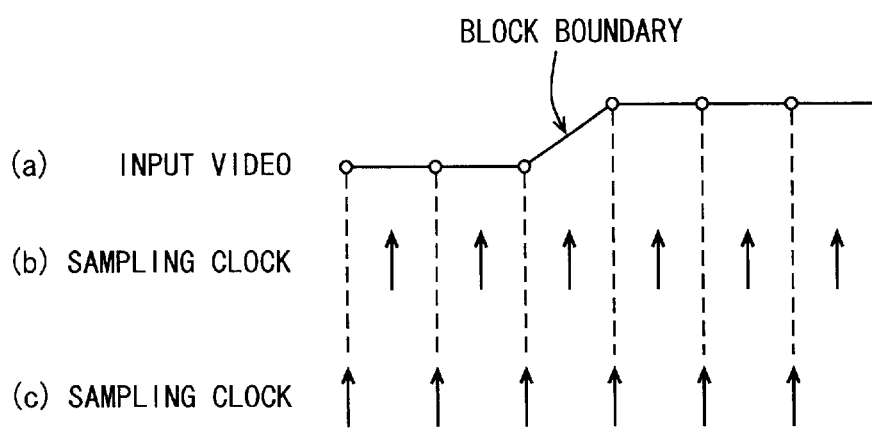
FIG. 23 is a diagram illustrating how a video signal 601 and a clock (CK) are related to each other.

FIG. 23 is a diagram illustrating how a video signal 601 and a clock (CK) are related to each other.

Hereinafter, by referring to FIG. 20 to FIG. 23, it is described stepwise how the video processing system 60 using the block detecting apparatus according to the sixth embodiment of the present invention is operated.

First of all, components in the video processing system 60 of the sixth embodiment are each described.

The AD converter 61 converts the received analog video signal 601 into a digital video signal. The video signal processing device 62 executes various types of processing relevant to the video signal such as picture enhancement. The DA converter 63 converts the digital video signal into the analog video signal. The horizontal block boundary detecting part 64 detects the block boundary in the horizontal direction from the received digital video signal. The clock generating device 65 forms a PLL circuit of a line clock, and generates a regeneration clock (CK) used for each component to process. Herein, as components of the clock regenerating device 65 are conventionally all known, further description is not made. The controlling part 66 includes a control device, such as a CPU, for temporally filtering output signals of the horizontal block boundary detecting part 64, and controls the clock generating device 65 in accordance with the signal outputted from the horizontal block boundary detecting part 64.

Next, it is described how the video processing system 60 of the sixth embodiment is operated to process.

The video signal 601 inputted into the AD converter 61 is converted into a digital video signal according to the regeneration clock (CK) generated in the clock regenerating device 65. The converted digital signal is subjected to a desired video signal processing in the video signal processing device 62, and is converted into an analog video signal in the DA converter 63. Further, the converted digital video signal is inputted into the horizontal block boundary detecting portion 64, and then is subjected to accumulation/addition of the horizontal block noise so as to be transmitted to the controlling part 66.

In the horizontal block boundary detecting part 64, the horizontal HPF 641 receives the video signal 601, and then extracts only high frequency components in the horizontal direction. The absolute value taking part 642 receives a signal outputted from the horizontal HPF 641, and takes an absolute value thereof so as to change the signal to a positive value. The vertical accumulating/adding part 643 receives a signal outputted from the absolute value taking part 642, and performs accumulation/addition so as to output the horizontal one-dimensional signal 115 having a peak value at intervals in the horizontal direction (see FIG. 2). The HPF 644 extracts high frequency components for the purpose of improving accuracy of the signal outputted from the vertical accumulating/adding part 643, and detects a horizontal block noise level. The N-point accumulating/adding part 645 accumulates/adds and outputs noise observed in every predetermined N-point (where N indicates the number of pixels in a block), that is, noise observed at the same pixel position in each block. Herein, in a case where the block noise arises at 8 (pixels)×8 (lines) intervals in MPEG2, for example, the N-point accumulating/adding part 645 sets N to "8", and determines the horizontal block boundary so as to output the same to the controlling part 66.

Note that, to detect the horizontal block noise in a very accurate manner, a coring device passing only signals of a small amplitude may be inserted into an output signal path of the horizontal HPF 641 or the absolute value taking part 642.

Next, by referring to FIGS. 22(*a*) and (*b*) and FIG. 23, it is described how the dot clock control is done.

First, in a case where the dot clock is not properly regenerated (that is, when the dot clock of the original video signal 601 and regeneration clock (CK) are not coincided), a phase of the sampling clock may shift (FIG. 23(*b*)) with respect to the video signal (FIG. 23(*a*)). If this is the case, an accumulation/addition result of the N-point outputted by the N-point accumulating/adding part 645 to the controlling part 66 will have a high level at a plurality of points as shown in FIG. 22(*a*) (in the drawing, two points of 4 and 5).

On the other hand, in a case where the dot clock is accurately regenerated (that is, when the dot clock of the original video signal 601 and the regeneration clock (CK) are coincided), the phase of the sampling clock does not shift (FIG. 23, section (c)) with respect to the video signal (FIG. 23, section (a)). If this is the case, the accumulation/addition result of the N-point outputted from the N-point accumulating/adding part 645 to the controlling part 66 will have a high level only at a point as shown in FIG. 22(*b*) (in the drawing, a position of 5).

As is known from this, the controlling part 66 executes a feedback control of changing delay of a variable delay 645 in the clock regeneration device 65 in such a manner as to set the accumulation/addition result of the N-point outputted from the N-point accumulating/adding part 645 to have a high level at only one position. Therefore, it becomes possible to correctly regenerate the clock phase sampled by the to-receive video signal 601 in the video processing system 60.

As is clear from the foregoing, the video processing system 25 60 using the block detecting apparatus according to the sixth embodiment of the present invention detects horizontal block boundary corresponding to a to-receive video signal, and then regenerates a dot clock in accordance with positions thereof. In this manner, a clock whose phase is coincided with that of a dot clock of an original video signal can correctly be regenerated.

Note that, in a typical hardware environment, each function realized by the block noise detecting apparatus 10, 20, the block noise eliminating apparatus 30,40, and 50, and the video processing system 60 according to the aforementioned first to sixth embodiments can be realized by a memory device in which predetermined program data is stored (ROM, RAM, hard disk, for example) and a CPU which runs the program data. In such case, the respective program data can be introduced via a recording medium such as CD-ROM or floppy disk.

INDUSTRIAL APPLICABILITY

As is described in the foregoing, in a video processing device (a television receiver, for example) using digital video signals subjected to lossy encoding on a predetermined image block basis, the present invention can be applied, first, to correctly detect and eliminate block noise to be arisen when the video signal is decoded, and second, to correctly regenerate a dot clock.

What is claimed is:

1. A block noise detecting apparatus for detecting, from a digital video signal subjected to lossy encoding on a predetermined image block basis, block noise caused by decoding the video signal, said block noise detecting the apparatus comprising:

signal extracting means for receiving the video signal and extracting a high frequency component from the video signal;

absolute value taking means for taking an absolute value of a high frequency component signal outputted from said signal extracting means;

accumulating/adding means for accumulating/adding an absolute value signal outputted from said absolute value taking means for a predetermined period;

periodicity detecting means for detecting periodicity of the block noise in accordance with an accumulation/ addition result outputted from said accumulating/ adding means; and block boundary determining means for determining a block boundary, where the block noise is generated, from a periodic signal detected by said periodicity detecting means.

2. The block noise detecting apparatus according to claim 1, wherein said block boundary determining means distinguishes, with binary values, between positional information on the block boundary and positional information on a remainder of an image.

3. The block noise detecting apparatus according to claim 2, further comprising:

frame difference taking means for receiving the video signal and determining a signal difference among a plurality of predetermined frames of the video signal;

region determining means for determining, with reference to whether or not the signal difference outputted from said frame difference taking means is greater than a predetermined threshold value, a noise region where the block noise to be eliminated is observed; and block edge controlling means for masking the block boundary determined by said block boundary determining means in the noise region determined by said region determining means, and then determining a portion of the block boundary corresponding to the noise region.

4. The block noise detecting apparatus according to claim 2; wherein said signal extracting means, said absolute value taking means, said accumulating/adding means, and said periodicity detecting means each execute processing for the video signal in at least one of a horizontal direction and a vertical direction.

5. The block noise detecting apparatus according to claim 1, further comprising:

frame difference taking means for receiving the video signal and determining a signal difference among a plurality of predetermined frames of the video signal;

region determining means for determining, with reference to whether or not the signal difference outputted from said frame difference taking means is greater than a predetermined threshold value, a noise region where the block noise to be eliminated is observed; and block edge controlling means for masking the block boundary determined by said block boundary determining means in the noise region determined by said region determining means, and then determining a portion of the block boundary corresponding to the noise region.

6. The block noise detecting apparatus according to claim 5, wherein said frame difference taking means determines a signal difference between a current frame and a previous frame.

7. The block noise detecting apparatus according to claim 6 wherein said region determining means distinguishes, with binary values, between a part of the signal difference exceeding the threshold value and a part of the signal difference not exceeding the threshold value.

8. The block noise detecting apparatus according to claim 6, further comprising singular point eliminating means for excluding a noise part observed in a predetermined small region of the noise region determined by said region determining means, wherein said block edge controlling means masks the block boundary determined by the block boundary determining means in the noise region excluding the noise part outputted from said singular point eliminating means.

9. The block noise detecting apparatus according to claim 6, wherein said signal extracting means, said absolute value taking means, said accumulating/adding means, and said periodicity detecting means each execute processing for the video signal in at least one of a horizontal direction and a vertical direction.

10. The block noise detecting apparatus according to claim 5, wherein said region determining means distinguishes, with binary values, between a part of the signal difference exceeding the threshold value and a part of the signal difference not exceeding the threshold value.

11. The block noise detecting apparatus according to claim 10, further comprising singular point eliminating means for excluding a noise part observed in a predetermined small region of the noise region determined by said region determining means, wherein said block edge controlling means masks the block boundary determined by said block boundary determining means in the noise region excluding the noise part outputted from said singular point eliminating means.

12. The block noise detecting apparatus according to claim 10, wherein said signal extracting means, said absolute value taking means, said accumulating/adding means, and said periodicity detecting means each execute processing for the video signal in at least one of a horizontal direction and a vertical direction.

13. The block noise detecting apparatus according to claim 5, further comprising singular point eliminating means for excluding a noise part observed in a predetermined small region of the noise region determined by said region determining means, wherein said block edge controlling means masks the block boundary determined by said block boundary determining means in the noise region excluding the noise part outputted from said singular point eliminating means.

14. The block noise detecting apparatus according to claim 13, wherein said signal extracting means, said absolute value taking means, said accumulating/adding means, and said periodicity detecting means each execute processing for said the video signal in at least one of a horizontal direction and a vertical direction.

15. The block noise detecting apparatus according to claim 5, wherein said signal extracting means, said absolute value taking means, said accumulating/adding means, and said periodicity detecting means each execute processing for the video signal in at least one of a horizontal direction and a vertical direction.

16. The block noise detecting apparatus according to claim 1, wherein said signal extracting means, said absolute value taking means, said accumulating/adding means, and said periodicity detecting means each execute processing for the sad video signal in at least one of a horizontal directional and a vertical direction.

17. The block noise detecting apparatus according to claim 16, wherein, when each of the processing is executed for the video signal in the vertical direction, said periodicity detecting means successively changes frames of the video signal used for detection according to a format of the video signal to be inputted.

18. A block noise eliminating apparatus for detecting and eliminating, from a digital video signal subjected to lossy encoding on a predetermined image block basis, block noise caused by decoding the video signal, said block noise elimination apparatus comprising:

signal extracting means for receiving the video signal and extracting only a high frequency component from the video signal;

absolute value taking means for taking an absolute value of a high frequency component signal outputted from said signal extracting means;

accumulating/adding means for accumulating/adding an absolute value signal outputted from said absolute value taking means for a predetermined period;

periodicity detecting means for detecting periodicity of the block noise in accordance with an accumulation/addition result outputted from said accumulating/adding means;

block boundary determining means for determining a block boundary, where the block noise is generated, from a periodic signal detected by said periodicity detecting means; and block noise eliminating means for eliminating the block noise with respect to the block boundary.

19. The block noise eliminating apparatus according to claim 18, wherein said block boundary determining means distinguishes, with binary values, between positional information on the block boundary and positional information on a remainder of an image.

20. The block noise eliminating apparatus according to claim 19, further comprising:

frame difference taking means for receiving the video signal and determining a signal difference among a plurality of predetermined frames of the video signal;

region determining means for determining, with reference to whether or not the signal difference outputted from said frame difference taking means is greater than a predetermined threshold value, a noise region where the block noise to be eliminated is observed; and block edge controlling means for masking the block boundary determined by said block boundary determining means in the noise region determined by said region determining means, and then determining a portion of the block boundary corresponding to the noise region, wherein said block noise eliminating means eliminates the block noise with respect to the portion of the block boundary corresponding to the noise region.

21. The block noise eliminating apparatus according to claim 19, wherein said signal extracting means, said absolute value taking means, said accumulating/adding means, and said periodicity detecting means each execute processing for the video signal in at least one of a horizontal direction and a vertical direction.

22. The block noise eliminating apparatus according to claim 18, further comprising:

frame difference taking means for receiving the video signal and determining a signal difference among a plurality of predetermined frames of the video signal;

region determining means for determining, with reference to whether or not the signal difference outputted from said frame difference taking means is greater than a predetermined threshold value, a noise region where the block noise to be eliminated is observed; and block edge controlling means for masking the block boundary determined by said block boundary determining means in the noise region determined by said region determining means, and then determining a portion of the block boundary corresponding to the noise region, wherein said block noise eliminating means eliminates the block noise with respect to the portion of the block boundary corresponding to the noise region.

23. The block noise eliminating apparatus according to claim 22, wherein said frame difference taking means determines the signal difference between a current frame and a previous frame.

24. The block noise eliminating apparatus according to claim 23, wherein said region determining means distinguishes, with binary values, between a part of the signal difference exceeding the threshold value and a part of the signal difference not exceeding the threshold value.

25. The block noise eliminating means according to claim 23, further comprising singular point eliminating means for excluding a noise part observed in a predetermined small region of the noise region determined by said region determining means, wherein
said block edge controlling means masks the block boundary determined by said block boundary determining means in the noise region excluding the noise part outputted from said singular point eliminating means.

26. The block noise eliminating apparatus according to claim 23, wherein said signal extracting means, said absolute value taking means, said accumulating/adding means, and said periodicity detecting means each execute processing for the video signal in at least one of a horizontal direction and a vertical direction.

27. The block noise eliminating apparatus according to claim 22, wherein said region determining means distinguishes, with binary values, between a part of the signal difference exceeding the threshold value and a part of the signal difference not exceeding the threshold value.

28. The block noise eliminating means according to claim 27, further comprising singular point eliminating means for excluding a noise part observed in a predetermined small region of the noise region determined by said region determining means, wherein
said block edge controlling means masks the block boundary determined by said block boundary determining means in the noise region excluding the noise part outputted from said singular point eliminating means.

29. The block noise eliminating apparatus according to claim 27, wherein said signal extracting means, said absolute value taking means, said accumulating/adding means, and said periodicity detecting means each execute processing for the video signal in at least one of a horizontal direction and a vertical direction.

30. The block noise eliminating means according to claim 22, further comprising singular point eliminating means for excluding a noise part observed in a predetermined small region of the noise region determined by said region determining means, wherein
said block edge controlling means masks the block boundary determined by said block boundary determining means in the noise region excluding the noise part outputted from said singular point eliminating means.

31. The block noise eliminating apparatus according to claim 30, wherein said signal extracting means, said absolute value taking means, said accumulating/adding means, and said periodicity detecting means each execute processing for the video signal in at least one of a horizontal direction and a vertical direction.

32. The block noise eliminating apparatus according to claim 22, wherein said signal extracting means, said absolute value taking means, said accumulating/adding means, and said periodicity detecting means each execute processing for the video signal in at least one of a horizontal direction and a vertical direction.

33. The block noise eliminating apparatus according to claim 18, wherein said signal extracting means, said absolute value taking means part, said accumulating/adding means, and said periodicity detecting means each execute processing for the video signal in at least one of a horizontal direction and a vertical direction.

34. The block noise eliminating apparatus according to claim 33, further comprising identifying means for identifying a format of the video signal to be inputted, wherein when each of the processing is executed for the video signal in the vertical direction,
said identifying means has said periodicity detecting means successively change frames of the video signal used for detection according to the format.

35. A block noise eliminating apparatus for detecting and eliminating, from a digital video signal subjected to lossy encoding on a predetermined image block basis, block noise caused by decoding the video signal, said block noise eliminating apparatus comprising:
vertical block boundary detecting means for receiving the video signal and detecting with respect to the video signal, a vertical block boundary where the block noise is generated, in a lateral direction and a vertical block noise level on a screen;
horizontal block boundary detecting means for receiving the video signal and detecting, with respect to the video signal, a horizontal block boundary, where the block noise is generated, in a longitudinal direction and a horizontal block noise level on the screen;
block area detecting means for specifying a block boundary in both the longitudinal direction and the lateral direction from the vertical block boundary and the horizontal block boundary detected in said vertical block boundary detecting means and said horizontal block boundary detecting means, respectively; and
block boundary smoothing means for smoothing the video signal to be inputted in a predetermined manner corresponding to the block boundary in both the longitudinal direction and the lateral direction specified by said block area detecting means,
wherein said vertical block boundary detecting means comprises:
a vertical high-pass filter for extracting a vertical high frequency component of the video signal;
first absolute value taking means for taking an absolute value of a high frequency component signal outputted from said vertical high-pass filter;
horizontal accumulating/adding means for accumulating/adding an absolute value signal outputted from said first absolute value taking means in a horizontal direction;
a first high-pass filter for extracting a high frequency component from an accumulated/added high frequency component signal outputted from said horizontal accumulating/adding means;
first N-point accumulating/adding means for accumulating/adding a signal outputted from said first high-pass filter on a predetermined N-point basis, where N is a positive integer;
a first temporal filter for detecting the vertical block noise level of the video signal by extending the signal outputted from said first high-pass filter in a temporal direction;
first maximum value detecting means for determining a maximum value and a position of the maximum value from among N-piece accumulated/added values determined by said first N-point accumulating/adding means through accumulation/addition; and
first masking means for masking the vertical block noise level detected by said first temporal filter at the position of the maximum value outputted from said first maximum value detecting means, and then determining the vertical block boundary corresponding to the position, and wherein said horizontal block boundary detecting means comprises:
- a horizontal high-pass filter for extracting a horizontal high frequency component of the video signal;
- second absolute value taking means for taking an absolute value of a high frequency component signal outputted from said horizontal high-pass filter;
- vertical accumulating/adding means for accumulating/adding an absolute value signal outputted from said second absolute value taking means in a vertical direction;
- a second high-pass filter for extracting a high frequency component from an accumulated/added high frequency component signal outputted from said vertical accumulating/adding means;
- second N-point accumulating/adding means for accumulating/adding a signal outputted from said second high-pass filter on a predetermined N-point basis;
- a second temporal filter for detecting the horizontal block noise level of the video signal by extending the signal outputted from said second high-pass filter in a temporal direction;
- second maximum value detecting means for determining a maximum value and a position of the maximum value from among N-piece accumulated/added values determined by said second N-point accumulating/adding means through accumulation/addition; and
- second masking means for masking the horizontal block noise level detected by said second temporal filter at the position of the maximum value outputted from said second maximum value detecting means, and then determining the horizontal block boundary corresponding to the position.

36. The block noise eliminating apparatus according to claim 35, wherein said block boundary smoothing means comprises:
- a horizontal high-pass filter for extracting a horizontal high frequency component of the video signal;
- first multiplying means for multiplying an output of said horizontal high-pass filter and an output of said horizontal block boundary detecting means;
- first deducting means for deducting an output of said first multiplying means from the video signal;
- a vertical high-pass filter for extracting a vertical high frequency component of the video signal;
- second multiplying means for multiplying an output of said vertical high-pass filter and an output of said vertical block boundary detecting means; and
- second deducting means for deducting an output of said second multiplying means from the video signal, wherein
- the block noise is eliminated according to the horizontal and vertical block noise levels.

37. The block noise eliminating apparatus according to claim 36, further comprising picture enhancing means for controlling a picture enhancement level emphasizing an outline part of the video signal according to the horizontal block noise level detected by said horizontal block boundary detecting means and the vertical block noise level detected by said vertical block boundary detecting means.

38. The block noise eliminating apparatus according to claim 36, further comprising controlling means for specifying the video signal to be inputted in accordance with the horizontal block noise level detected by said horizontal block boundary detecting means and the vertical block noise level detected by said vertical block boundary detecting means, wherein
- said controlling means is operable to display a judgement result of the specification of the video signal on a screen in a predetermined format.

39. The block noise eliminating apparatus according to claim 35, further comprising picture enhancing means for controlling a picture enhancement level emphasizing an outline part of the video signal according to the horizontal block noise level detected by said horizontal block boundary detecting means and the vertical block noise level detected by vertical block boundary detecting means.

40. The block noise eliminating apparatus according to claim 35, further comprising controlling means for specifying the video signal to be inputted in accordance with the horizontal block noise level detected by said horizontal block boundary detecting means and the vertical block noise level detected by said vertical block boundary detecting means, wherein
- said controlling means is operable to display a judgement result of the specification of the video signal on a screen in a predetermined format.

41. A block noise eliminating apparatus for detecting and eliminating, from a video signal subjected to lossy encoding on a predetermined image block basis, block noise caused by decoding the video signal, said block noise eliminating apparatus comprising:
- AD converting means for receiving an analog video signal and then converting the analog video signal into a first digital video signal;
- digital decoding means for receiving a second digital video signal as an encoded digital signal and for decoding and outputting the second video signal including decoded block boundary information;
- a selector for receiving the first digital video signal outputted from said AD converting means and the second digital video signal outputted from said digital decoding means and selectively outputting one of the first and second digital video signals, as the video signal, as is externally instructed;
- vertical block boundary detecting means for receiving the video signal selected by said selector and detecting, with respect to the video signal, a vertical block boundary, where the block noise is generated, in a lateral direction and a vertical block noise level on a screen;
- horizontal block boundary detecting means for receiving the video signal selected by said selector and detecting, with respect to the video signal, a horizontal block boundary, where the block noise is generated in a longitudinal direction and a horizontal block noise level on a the screen;
- block area detecting means for specifying a block boundary in both the longitudinal direction and the lateral direction from the vertical block boundary and the horizontal block boundary detected in said vertical block boundary detecting means and said horizontal block boundary detecting means respectively; and
- block boundary smoothing means for smoothing the video signal in a predetermined manner corresponding to the block boundary in both the longitudinal direction and the lateral direction specified by said block area detecting means, wherein
  - said vertical block boundary detecting means and said horizontal block boundary detecting means output, to said block area detecting means, the vertical block boundary and the horizontal block boundary, respectively, when said selector selects the first video signal outputted from said AD converting means, and output a block boundary based on the block boundary information outputted from said digital decoding means when said selector selects the second video signal outputted from said digital decoding means.

42. The block noise eliminating apparatus according to claim 41, wherein said vertical block boundary detecting means comprises:
   a vertical high-pass filter for extracting a vertical high frequency component of the video signal;
   first absolute value taking means for taking an absolute value of a high frequency component signal outputted from said vertical high-pass filter;
   horizontal accumulating/adding means for accumulating/adding an absolute value signal outputted from said first absolute value taking means in a horizontal direction;
   a first high-pass filter for extracting a high frequency component from an accumulated/added high frequency component signal outputted from said horizontal accumulating/adding means;
   first N-point accumulating/adding means for accumulating/adding a signal outputted from said first high-pass filter on a predetermined N-point basis, where N is a positive integer;
   a first temporal filter for detecting the vertical block noise level of the selected video signal by extending the signal outputted from said first high-pass filter in a temporal direction;
   first maximum value detecting means for determining a maximum value and a position of the maximum value among N-piece accumulated/added values determined by said first N-point accumulating/adding means through accumulation/addition;
   a first selector for synchronizing with the video signal and selectively outputting either one of the block boundary information outputted from said digital decoding means or the position of the maximum value outputted from said first maximum value detecting means, as a first selected output; and
   first masking means for masking the vertical block noise level detected by said first temporal filter at the first selected output from said first selector, and determining the vertical block boundary corresponding to the position, and wherein
said horizontal block boundary detecting means comprises:
   a horizontal high-pass filter for extracting a horizontal high frequency component of the video signal;
   second absolute value taking means for taking an absolute value of a high frequency component signal outputted from said horizontal high-pass filter;
   vertical accumulating/adding means for accumulating/adding an absolute value signal outputted from said second absolute value taking means in a vertical direction;
   a second high-pass filter for extracting a high frequency component from an accumulated/added high frequency component signal outputted from said vertical accumulating/adding means;
   second N-point accumulating/adding means for accumulating/adding a signal outputted from said second high-pass filter on a predetermined N-point basis;
   a second temporal filter for detecting the horizontal block noise level of the video signal by extending the signal outputted from said second high-pass filter in a temporal direction;
   second maximum value detecting means for determining a maximum value and a position of the maximum value among N-piece accumulated/added values determined by said second N-point accumulating/adding means through accumulation/addition;
   a second selector for synchronizing with the video signal and selectively outputting either one of the block boundary information outputted from said digital decoding means or the position of the maximum value outputted from said second maximum value detecting means, as a second selected output; and
   second masking means for masking the horizontal block noise level detected by said second temporal filter at the second selected output from said second selector, and determining the horizontal block boundary corresponding to the position.

43. The block noise eliminating apparatus according to claim 42, wherein said block boundary smoothing means comprises:
   a horizontal high-pass filter for extracting a horizontal high frequency component of the video signal;
   first multiplying means for multiplying an output of said horizontal high-pass filter and an output of said horizontal block boundary detecting means;
   first deducting means for deducting an output of said first multiplying means from the video signal;
   a vertical high-pass filter for extracting only a vertical high frequency component of the video signal;
   second multiplying means for multiplying an output of said vertical high-pass filter and an output of said vertical block boundary detecting means; and
   second deducting means for deducting an output of the second multiplying means from the video signal, wherein
   the block noise is eliminated according to the block noise level.

44. The block noise eliminating apparatus according to claim 42, further comprising picture enhancing means for controlling a picture enhancement level emphasizing an outline part of the video signal according to the horizontal block noise level detected by said horizontal block boundary detecting means and the vertical block noise level detected by said vertical block boundary detecting means.

45. The block noise eliminating apparatus according to claim 42, further comprising controlling means for specifying the video signal to be inputted in accordance with the horizontal block noise level detected by said horizontal block boundary detecting means and the vertical block noise level detected by said vertical block boundary detecting means, wherein
   said controlling means is operable to display a judgement result of the specification of the video signal on a screen in a predetermined format.

46. The block noise eliminating apparatus according to claim 41, further comprising picture enhancing means for controlling a picture enhancement level emphasizing an outline part of the video signal according to the horizontal block noise level detected by said horizontal block boundary detecting means and the vertical block noise level detected by said vertical block boundary detecting means.

47. The block noise eliminating apparatus according to claim 41, further comprising controlling means for specifying the video signal to be inputted in accordance with the horizontal block noise level detected by said horizontal block boundary detecting means and the vertical block noise level detected by said vertical block boundary detecting means, wherein said controlling means is operable to display a judgement result of the specification of the video signal on a screen in a predetermined format.

48. A block noise eliminating apparatus for detecting and eliminating, from a digital video signal subjected to lossy encoding on a predetermined image block basis, block noise caused by decoding the video signal said block noise eliminating apparatus comprising:

vertical block boundary detecting means for receiving the video signal and detecting, with respect to the video signal, a vertical block boundary, where the block noise is generated, in a lateral direction and a vertical block noise level on a screen;

horizontal block boundary detecting means for receiving the video signal and detecting, with respect to the video signal, a horizontal block boundary, where the block noise is generated, in a longitudinal direction and a horizontal block noise level on the screen;

block area detecting means for specifying a block boundary in both the longitudinal direction and the lateral direction from the vertical block boundary and the horizontal block boundary detected in said vertical block boundary detecting means and said horizontal block boundary detecting means, respectively;

block boundary smoothing means for smoothing the video signal to be inputted in a predetermined manner corresponding to the block boundary in both the longitudinal direction and the lateral direction specified by said block area detecting means; and controlling means for specifying the video signal to be inputted in accordance with the horizontal block noise level detected by said horizontal block boundary detecting means and the vertical block noise level detected by said vertical block boundary detecting means, wherein said controlling means is operable to display a judgement result of the specification of the video signal on a screen in a predetermined format.

49. A vertical block boundary detecting apparatus for detecting, from a digital video signal subjected to lossy encoding on a predetermined image block basis, block noise in a vertical direction caused by decoding the video signal, said vertical block boundary detecting apparatus comprising:

a vertical high-pass filter for receiving the video signal and extracting a vertical high frequency component of the video signal;

absolute value taking means for taking an absolute value of a high frequency component signal outputted from said vertical high-pass filter;

horizontal accumulating/adding means for accumulating/adding an absolute value signal outputted from said absolute value taking means in a horizontal direction;

a high-pass filter for extracting a high frequency component from an accumulated/added high frequency component signal outputted from said horizontal accumulating/adding means;

N-point accumulating/adding means for accumulating/adding a signal outputted from said high-pass filter on a predetermined N-point basis, where N is a positive integer;

a temporal filter for detecting a block noise level of the video signal by extending the signal outputted from said high-pass filter in a temporal direction;

maximum value detecting means for determining a maximum value and a position of the maximum value among N-piece accumulated/added values determined by said N-point accumulating/adding means through accumulation/addition; and masking means for masking the block noise level detected by said temporal filter at the position of the maximum value outputted from said maximum value detecting means, and determining a vertical block boundary corresponding to the position.

50. A horizontal block boundary detecting apparatus for detecting, from a digital video signal subjected to lossy encoding on a predetermined image block basis, block noise in a horizontal direction caused by decoding the video signal, said horizontal block boundary detecting apparatus comprising:

a horizontal high-pass filter for receiving the video signal and extracting a horizontal high frequency component of the video signal;

absolute value taking means for taking an absolute value of a high frequency component signal outputted from said horizontal high-pass filter;

vertical accumulating/adding means for accumulating/adding an absolute value signal outputted from said absolute value taking means in a vertical direction;

a high-pass filter for extracting a high frequency component from an accumulated/added high frequency component signal outputted from said vertical accumulating/adding means;

N-point accumulating/adding means for accumulating/adding a signal outputted from said high-pass filter on a predetermined N-point basis, where N is a positive integer;

a temporal filter for detecting a block noise level of the video signal by extending the signal outputted from said high-pass filter in a temporal direction;

maximum value detecting means for determining a maximum value and a position of the maximum value among N-piece accumulated/added values determined by said N-point accumulating/adding means through accumulation/addition; and masking means for masking the block noise level detected by said temporal filter at the position of the maximum value outputted from said maximum value detecting means, and determining a horizontal block boundary corresponding to the position.

51. A dot clock controlling apparatus for controlling a dot clock to be regenerated in a video processing system in which a digital video signal subjected to lossy encoding on a predetermined image block basis is processed, said dot clock controlling apparatus comprising:

clock generating means for generating the dot clock used in the video processing system in accordance with a horizontal synchronizing pulse, horizontal block boundary detecting means for receiving the video signal and detecting a longitudinal block boundary, where block noise is generated, on a screen with respect to the video signal; and controlling means for changing a delay of said clock generating means such that the longitudinal block boundary detected by said horizontal block boundary detecting means periodically has a single maximum point, wherein said horizontal block boundary detecting means comprises:
- a horizontal high-pass filter for receiving the video signal and extracting a horizontal high frequency component of the video signal;
- absolute value taking means for taking an absolute value of a high frequency component signal outputted from said horizontal high-pass filter;
- vertical accumulating/adding means for accumulating/adding an absolute value signal outputted from said absolute value taking means in a vertical direction;
- a high-pass filter for extracting a high frequency component from an accumulated/added high frequency component signal outputted from said vertical accumulating/adding means; and
- N-point accumulating/adding means for accumulating/adding a signal outputted from said high-pass filter on a predetermined N-point basis, where N is a positive integer.

52. A program recorded on a recording medium, to be run in a computer device for detecting block noise from a digital video signal subjected to lossy encoding on a predetermined image block basis caused by decoding the video signal, said program comprising:
- extracting only a high frequency component from the video signal as an extracted high frequency component signal;
- taking an absolute value of the extracted high frequency component signal as an absolute-value-taken high frequency component signal;
- accumulating/adding the absolute-value-taken high frequency component signal for a predetermined period;
- detecting a periodicity of the block noise in accordance with a result of said accumulating/adding operation; and
- determining a block boundary, where the block noise is generated, in accordance with a signal having the periodicity detected by said detecting operation.

53. The program according to claim 52, further comprising eliminating the block noise with respect to the block boundary.

54. The program according to claim 53, wherein said determining of the block boundary comprises distinguishing positional information on the block boundary and positional information on a remainder of an image with binary, values from each other.

55. The program according to claim 53, further comprising:
- determining a signal difference among a plurality of predetermined frames of the video signal;
- determining a noise region where the block noise to be eliminated is observed with reference to whether or not the signal difference is greater than a predetermined threshold value; and
- masking the block boundary in the noise region, and determining a portion of the block boundary corresponding to the noise region.

56. The program according to claim 53, wherein each of said operations is executed in at least one of a horizontal direction and a vertical direction of the video signal.

57. The program according to claim 52, wherein said determining of the block boundary comprises distinguishing positional information on the block boundary and positional information on a remainder of an image, with binary values, from each other.

58. The program according to claim 57, further comprising:
- determining a signal difference among a plurality of predetermined frames of the video signal;
- determining a noise region where the block noise to be eliminated is observed with reference to whether or not the signal difference is greater than a predetermined threshold value; and
- masking the block boundary in the noise region, and determining a portion of the block boundary corresponding to the noise region.

59. The program according to claim 57, wherein each of said operations is executed in at least one of a horizontal direction and a vertical direction of the video signal.

60. The program according to claim 52, further comprising:
- determining a signal difference among a plurality of predetermined frames of the video signal;
- determining a noise region where the block noise to be eliminated is observed with reference to whether or not the signal difference is greater than a predetermined threshold value; and
- masking the block boundary in the noise region, and determining a portion of the block boundary corresponding to the noise region.

61. The program according to claim 60, wherein said determining of the signal difference comprises determining a signal difference between a current frame and a previous frame.

62. The program according to claim 61, wherein said determining of the noise region comprises distinguishing a part of the signal difference exceeding the threshold value and a part of the signal difference not exceeding the threshold value, with binary values, from each other.

63. The program according to claim 61, further comprising eliminating a noise no part in a predetermined small region of the noise region, wherein
said determining a block boundary corresponding to the noise block comprises masking the block boundary in the noise region excluding the noise part.

64. The program according to claim 61, wherein each of said operations is executed in at least one of a horizontal direction and a vertical direction of the video signal.

65. The program according to claim 60, wherein said determining of the noise region comprises distinguishing a part of the signal difference exceeding the threshold value and a part of the signal difference not exceeding the threshold value with binary values, from each other.

66. The program according to claim 65, further comprising eliminating a noise part in a predetermined small region of the noise region, wherein
said determining of the block boundary corresponding to the noise block comprises masking the block boundary in the noise region excluding the noise part.

67. The program according to claim 65, wherein each of said operations is executed in at least one of a horizontal direction and a vertical direction of the video signal.

68. The program according to claim 60, further comprising eliminating a noise part in a predetermined small region of the noise region, wherein
said determining of the block boundary corresponding to the noise block comprises masking the block boundary in the noise region excluding the noise part.

69. The program according to claim 68, wherein each of said operations is executed in at least one of a horizontal direction and a vertical direction of the video signal.

70. The program according to claim 60, wherein each of said operations is executed in at least one of a horizontal direction and a vertical direction of the video signal.

71. The program according to claim 52, wherein each of said operations is executed in at least one of a horizontal direction and a vertical direction of the video signal.

72. The program according to claim 71, wherein, when each of said operations is executed in the vertical direction of the video signal, said detecting of the periodicity comprises successively changing frames used for detection corresponding to a format of the video signal to be inputted.

73. A program recorded on a recording medium to be run in a computer device for detecting block noise from a digital video signal subjected to lossy encoding on a predetermined image block basis caused by decoding the video signal, said program comprising:

detecting, with respect to the video signal, a vertical block boundary, where the block noise is generated, in a lateral direction and a vertical block noise level on a screen;

detecting, with respect to the video signal, a horizontal block boundary, where the block noise is generated, in a longitudinal direction and a horizontal block noise level on the screen;

specifying a block boundary in both the longitudinal direction and the lateral direction from the vertical block boundary and the horizontal block boundary obtained in said detecting as to the lateral direction and said detecting as to the longitudinal direction, respectively; and smoothing the video signal in a predetermined manner corresponding to the block boundary in both the longitudinal direction and the lateral direction, wherein said detecting as to the lateral direction comprises:

extracting a vertical high frequency component from the video signal as an extracted high frequency component signal;

taking an absolute value of the extracted high frequency component signal as an absolute value signal;

accumulating/adding the absolute value signal in a horizontal direction as an accumulated/added high frequency component signal;

extracting a high frequency component from the accumulated/added high frequency component signal as a signal;

accumulating/adding the signal outputted in said extracting of the high frequency component on a predetermined N-point basis where N is a positive integer;

detecting the vertical block noise level of the video signal by extending the signal outputted in said extracting of the high frequency component in a temporal direction;

determining a maximum value and a position of the maximum value among N-piece accumulated/added values determined by said accumulation/addition operation; and masking the detected vertical block noise level at the position of the maximum value, and determining the vertical block boundary corresponding to the position, and wherein said detecting as to the longitudinal direction comprises:

extracting a horizontal high frequency component of the video signal as an extracted high frequency component signal;

taking an absolute value of the extracted high frequency component signal as an absolute value signal;

accumulating/adding the absolute value signal in a vertical direction as an accumulated/added high frequency component signal;

extracting a high frequency component from the accumulated/added high frequency component signal as a signal;

accumulating/adding the signal outputted in said extracting of the high frequency component on a predetermined N-point basis;

detecting the horizontal block noise level of the video signal by extending the signal outputted in said extracting of the high frequency component in a temporal direction;

determining a maximum value and a position of the maximum value among N-piece accumulated/added values determined by said accumulation/addition operation; and masking the detected horizontal block noise level at the position of the maximum value, and determining the horizontal block boundary corresponding to the position.

74. The program according to claim 73, wherein said smoothing operation further comprises:

a horizontal operation of extracting only a horizontal high frequency component of the video signal;

a horizontal multiplying operation of multiplying an output in said horizontal operation and an output in said detecting at to the longitudinal direction;

deducting an output in said horizontal multiplying operation from the video signal;

a vertical operation of extracting a vertical high frequency component of the video signal;

a vertical multiplying operation of multiplying an output in said vertical operation and an output in said detecting as to the lateral direction; and deducting an output in said vertical multiplying operation from the video signal, wherein the block noise is eliminated according to the horizontal and vertical block noise levels.

75. The program according to claim 74, further comprising controlling a picture enhancement level emphasizing an outline of the video signal according to the horizontal and vertical block noise levels detected in said step of detecting as to the longitudinal direction and said step of detecting as to the lateral direction, respectively.

76. The program according to claim 74, further comprising specifying the video signal to be inputted in accordance with the horizontal and vertical block noise levels detected in said detecting as to the longitudinal direction and said detecting as to the lateral direction, respectively, as a judgement result, wherein said specifying comprises displaying the judgement result of the video signal on a screen in a predetermined format.

77. The program according to claim 73, further comprising controlling a picture enhancement level emphasizing an outline of the video signal according to the horizontal and vertical block noise levels detected in said detecting as to the longitudinal direction and said detecting as to the lateral direction, respectively.

78. The program according to claim 73, further comprising specifying the video signal to be inputted in accordance with the horizontal and vertical block noise levels detected in said detecting as to the longitudinal direction and said detecting as to the lateral direction, respectively, as a judgement result, wherein
said specifying comprises displaying the judgement result of the video signal on a screen in a predetermined format.

79. A program recorded on a recording medium to be run in a computer device for detecting block noise from a video signal subjected to lossy encoding on a predetermined image block basis caused by decoding the video signal said program for comprising:
converting an analog video signal into a first digital video signal;
decoding a second digital video signal as a digital-encoded video signal and outputting the second digital video signal including decoded block boundary information;
selecting one of the first digital video signal outputted in said converting operation and the second digital video signal outputted in said decoding and outputting operation, as the video signal, as is externally instructed;
detecting a lateral block boundary, where the block noise is generated, on a screen and a lateral block noise level with respect to the video signal outputted in said selecting operation;
detecting a longitudinal block boundary, where the block noise is generated, on the screen and a longitudinal block noise level with respect to the video signal outputted in said selecting operation;
specifying a block boundary in both the longitudinal direction and the lateral direction from the lateral block boundary and the longitudinal block boundary obtained in said detecting as to the lateral direction and said detecting as to longitudinal direction selected, respectively; and
smoothing the video signal in a predetermined manner according to the block boundary in both the longitudinal direction and the lateral direction, wherein
said detecting as to the lateral direction and said detecting as to the longitudinal direction each comprises outputting the block boundary based on the lateral block boundary and the longitudinal block boundary, respectively, for the first digital video signal outputted in said converting operation, and outputting the block boundary based on the decoded block boundary information for the second digital video signal outputted in said decoding and outputting operation.

80. The program according to claim 79, wherein said detecting as to the lateral direction comprises:
extracting a vertical high frequency component of the video signal as an extracted high frequency component signal;
taking an absolute value of the extracted high frequency component signal as an absolute value signal;
accumulating/adding the absolute value signal in a horizontal direction as an accumulated/added high frequency component signal;
extracting a high frequency component from the accumulated/added high frequency component signal as a signal;
accumulating/adding the signal outputted in said extracting of the high frequency component on a predetermined N-point basis, where N is a positive integer;
detecting the lateral block noise level of the video signal by extending the signal outputted in said extracting of the high frequency component in a temporal direction;
determining a maximum value and a position of the maximum value among N-piece accumulated/added values determined by said a accumulating/adding operation; and
synchronizing with said selecting operation, and selectively outputting one of the block boundary information and the position of the maximum value as a selected block boundary; and
masking the lateral block noise level at the selected block boundary outputted in said selectively outputting operation, and determining a vertical block boundary corresponding to the position of the maximum value as the lateral block boundary, and
said detecting as to the longitudinal direction comprises:
extracting a horizontal high frequency component of the selected video signal as an extracted high frequency component signal;
taking an absolute value of the extracted high frequency component signal as an absolute value signal;
accumulating/adding the absolute value signal in a vertical direction as an accumulated/added high frequency component signal;
extracting a high frequency component from the accumulated/added high frequency component signal as a signal;
accumulating/adding the signal outputted in said extracting of the high frequency component on a predetermined N-point basis;
detecting the longitudinal block noise level of the video signal by extending the signal outputted in said extracting of the high frequency component in a temporal direction;
determining a maximum value and a position of the maximum value among N-piece accumulated/added values determined by said accumulating/adding operation; and
synchronizing with said selecting operation, and selectively outputting one of the block boundary information and the position of the maximum value as a selected block boundary; and
masking the longitudinal block noise level at the selected block boundary outputted in said selectively outputting operation, and determining a horizontal block boundary corresponding to the position of the maximum value at the longitudinal block boundary.

81. The program according to claim 80, wherein said smoothing comprises:
a horizontal operation of extracting only a horizontal high frequency component of the video signal;
a horizontal multiplying operation of multiplying an output in said horizontal operation and an output in said detecting as to the longitudinal direction;
deducting an output in said horizontal multiplying operation from the video signal;
a vertical operation of extracting only a vertical high frequency component of the video signal;
a vertical multiplying operation of multiplying an output in said vertical operation and an output in said detecting as to the lateral direction; and deducting an output in said vertical multiplying operation from the video signal, wherein
the block noise is eliminated according to the lateral and longitudinal block noise levels.

82. The program according to claim 80, further comprising controlling a picture enhancement level emphasizing an outline of the video signal according to the longitudinal and lateral block noise levels detected in said detecting as to the longitudinal direction and said detecting as to the lateral direction, respectively.

83. The program according to claim 80, further comprising specifying the video signal to be inputted in accordance with the longitudinal and lateral block noise levels detected in said detecting as to the longitudinal direction and said detecting as to the lateral direction, respectively, as a judgement result, wherein
said specifying comprises displaying the judgement result of the video signal on a screen in a predetermined format.

84. The program according to claim 79, further comprising controlling a picture enhancement level emphasizing an outline of the video signal according to the longitudinal and lateral block noise levels detected in said detecting as to the longitudinal direction and said detecting as to the lateral direction, respectively.

85. The program according to claim 79, further comprising specifying the video signal to be inputted in accordance with the longitudinal and lateral block noise levels detected in said detecting as to the longitudinal direction and said detecting as to the lateral direction, respectively, as a judgement result, wherein
said specifying comprises displaying the judgement result of the video signal on a screen in a predetermined format.

86. A program recorded on a recording medium to be run in a computer device for detecting block noise from a digital video signal subjected to lossy encoding on a predetermined image block basis caused by decoding the video signal, said program comprising:
detecting, with respect to the video signal, a vertical block boundary, where the block noise is generated, in a lateral direction and a vertical block noise level on a screen;
detecting, with respect to the video signal, a horizontal block boundary, where the block noise is generated, in a longitudinal direction and a horizontal block noise level on the screen;
specifying a block boundary in both the longitudinal direction and the lateral direction from the vertical block boundary and the horizontal block boundary obtained in said detecting as to the lateral direction and said detecting as to the longitudinal direction, respectively;
smoothing the video signal in a predetermined manner corresponding to the block boundary in both the longitudinal direction and the lateral direction; and
specifying the video signal to be inputted in accordance with the longitudinal and lateral block noise levels detected in said detecting as to longitudinal direction and said detecting as to the lateral directions, respectively, as a judgement result, wherein
said specifying comprises displaying the judgement result on a screen in a predetermined format.

87. A program recorded on a recording medium to be run in a computer device for detecting block noise in one of a vertical direction and a horizontal direction from a digital video signal subjected to lossy encoding on a predetermined image block basis caused by decoding the video signal, said program comprising:
extracting one of a vertical high frequency component and a horizontal high frequency component of the video signal as an extracted high frequency component signal;
taking an absolute value of the extracted high frequency component signal as an absolute value signal;
accumulating/adding the absolute value signal in the horizontal direction or the vertical direction as an accumulated/added high frequency component signal;
extracting a high frequency component from the accumulated/added high frequency component signal as a signal;
accumulating/adding the signal outputted in said extracting of the high frequency component on a predetermined N-point basis, where N is a positive integer;
detecting a block noise level of the video signal by extending the signal outputted in said extracting of the high frequency component in a temporal direction;
determining a maximum value and a position of the maximum value among N-piece accumulated/added values determined by said accumulating/adding operation; and
masking the detected block noise level at the position of the maximum value, and determining a vertical block boundary or a horizontal block boundary corresponding to the position of the maximum value.

88. A program recorded on a recording medium to be run in a computer device for controlling a dot clock to be regenerated in a video processing system in which a digital video signal subjected to lossy encoding on a predetermined image block basis is processed, said program comprising:
receiving the video signal and detecting a block boundary with respect to the video signal, where block noise is generated, in a longitudinal direction on a screen; and
changing a clock delay such that the block boundary detected in said detecting operation periodically has a single maximum point with respect to a clock generating device in which the dot clock used for the video processing system is generated based on a horizontal synchronizing pulse,
wherein said detecting operation step comprises:
extracting a horizontal high frequency component of the video signal as an extracted high frequency component signal;
taking an absolute value of the extracted high frequency component signal as an absolute value signal;
accumulating/adding the absolute value signal in a vertical direction as an accumulated/added high frequency component signal;
extracting a high frequency component from the accumulated/added high frequency component signal as a signal; and
accumulating/adding the signal outputted in said extracting of the high frequency component on a predetermined N-point basis, where N is a positive integer.

89. A block noise eliminating apparatus for detecting and eliminating, from a digital video signal subjected to lossy encoding on a predetermined image block basis, block noise caused by decoding the video signal, said block noise eliminating apparatus comprising:

vertical block boundary detecting means for receiving the video signal and detecting, with respect to the video signal, a vertical block boundary, where the block noise is generated, in a lateral direction and a vertical block noise level on a screen;

horizontal block boundary detecting means for receiving the video signal and detecting, with respect to the video signal, a horizontal block boundary, where the block noise is generated, in a longitudinal direction and a horizontal block noise level on the screen;

block area detecting means for specifying a block boundary in both the longitudinal direction and the lateral direction from the vertical block boundary and the horizontal block boundary detected in said vertical block boundary detecting means and said horizontal block boundary detecting means, respectively;

block boundary smoothing means for smoothing the video signal to be inputted in a predetermined manner corresponding to the block boundary in both the longitudinal direction and the lateral direction specified by said block area detecting means;

picture enhancing means for controlling a picture enhancement level emphasizing an outline part of the video signal according to the horizontal block noise level detected by said horizontal block boundary detecting means and the vertical block noise detected by said vertical block boundary detecting means and controlling means for specifying the video signal to be inputted in accordance with the horizontal block noise level detected by said horizontal block boundary detecting means and the vertical block noise level detected by said vertical block boundary detecting means, wherein said controlling means is operable to display a judgement result of the specification of the video signal on a screen in a predetermined format.

90. A program recorded on a recording medium to be run in a computer device for detecting block noise from a digital video signal subjected to lossy encoding on a predetermined image block basis caused by decoding the video signal, said program comprising:

detecting with respect to the video signal, a vertical block boundary, where the block noise is generated, in a lateral direction and a vertical block noise level on a screen;

detecting, with respect to the video signal, a horizontal block boundary, where the block noise is generated, in a longitudinal direction and a horizontal block noise level on the screen;

specifying a block boundary in both the longitudinal direction and the lateral direction from the vertical block boundary and the horizontal block boundary obtained in said detecting as to the lateral direction and said detecting as to the longitudinal direction, respectively;

smoothing the video signal in a predetermined manner corresponding to the block boundary in both the longitudinal direction and the lateral direction;

controlling a picture enhancement level emphasizing an outline of the video signal according to the longitudinal and lateral block noise levels detected in said detecting as to the longitudinal direction and said detecting as to the lateral direction, respectively; and specifying the video signal to be inputted in accordance with the longitudinal and lateral block noise levels detected in said detecting as to the longitudinal direction and said detecting as to the lateral direction, respectively, as a judgement result, wherein said specifying comprises displaying the judgement result of the video signal on a screen in a predetermined format.

* * * * *